United States Patent [19]

Levy

[11] 4,158,236
[45] Jun. 12, 1979

[54] ELECTRONIC DICTIONARY AND LANGUAGE INTERPRETER

[75] Inventor: Michael Levy, Pembroke Pines, Fla.

[73] Assignee: Lexicon Corporation, Miami, Fla.

[21] Appl. No.: 848,527

[22] Filed: Nov. 3, 1977

Related U.S. Application Data

[63] Continuation-in-part of Ser. No. 723,049, Sep. 13, 1976, abandoned.

[51] Int. Cl.² .................... G06F 15/02; G06F 15/38
[52] U.S. Cl. .................................. 364/900; 364/419; 35/35 R
[58] Field of Search ... 364/200 MS File, 900 MS File, 364/706, 419, 300; 35/6, 8 R, 35 R, 9 B; 340/324 R

[56] References Cited

U.S. PATENT DOCUMENTS

| | | | |
|---|---|---|---|
| 3,271,743 | 9/1966 | Craft et al. | 364/900 |
| 3,312,946 | 4/1967 | Craft et al. | 364/900 |
| 3,859,635 | 1/1975 | Watson et al. | 364/200 |
| 3,938,099 | 2/1976 | Hyder | 364/900 |
| 3,952,184 | 4/1976 | Bassard | 364/419 |
| 3,956,740 | 5/1976 | Jones et al. | 364/900 |
| 3,971,925 | 7/1976 | Wenninger et al. | 364/900 |
| 4,012,725 | 3/1977 | Spangler et al. | 364/200 |
| 4,016,542 | 4/1977 | Azure et al. | 364/900 |
| 4,041,467 | 8/1977 | Cota et al. | 364/900 |

FOREIGN PATENT DOCUMENTS

1448211   9/1976   United Kingdom ............... 364/900

Primary Examiner—Mark E. Nusbaum
Attorney, Agent, or Firm—Cushman, Darby & Cushman

[57] ABSTRACT

A portable electronic dictionary with a micro-computer in a hand-held housing which mounts a plurality of alpha-numeric displays and a keyboard. A plug-in ROM stores a plurality of pairs of sequences of alpha-numeric characters and is searched by a central processing unit in the micro-computer under instructions stored as firmware in another ROM forming part of the micro-computer. One sequence of each stored pair is compared with a sequence which is entered into the keyboard and stored in a RAM also forming part of the micro-computer until a match is found. After one or more sequences have been entered into the keyboard and locations of matching pairs stored in the micro-computer RAM, the pairs of stored sequences can be rolled across the display. Either sequence of each pair can be compared with a sequence entered into the keyboard.

15 Claims, 23 Drawing Figures

Fig. 7

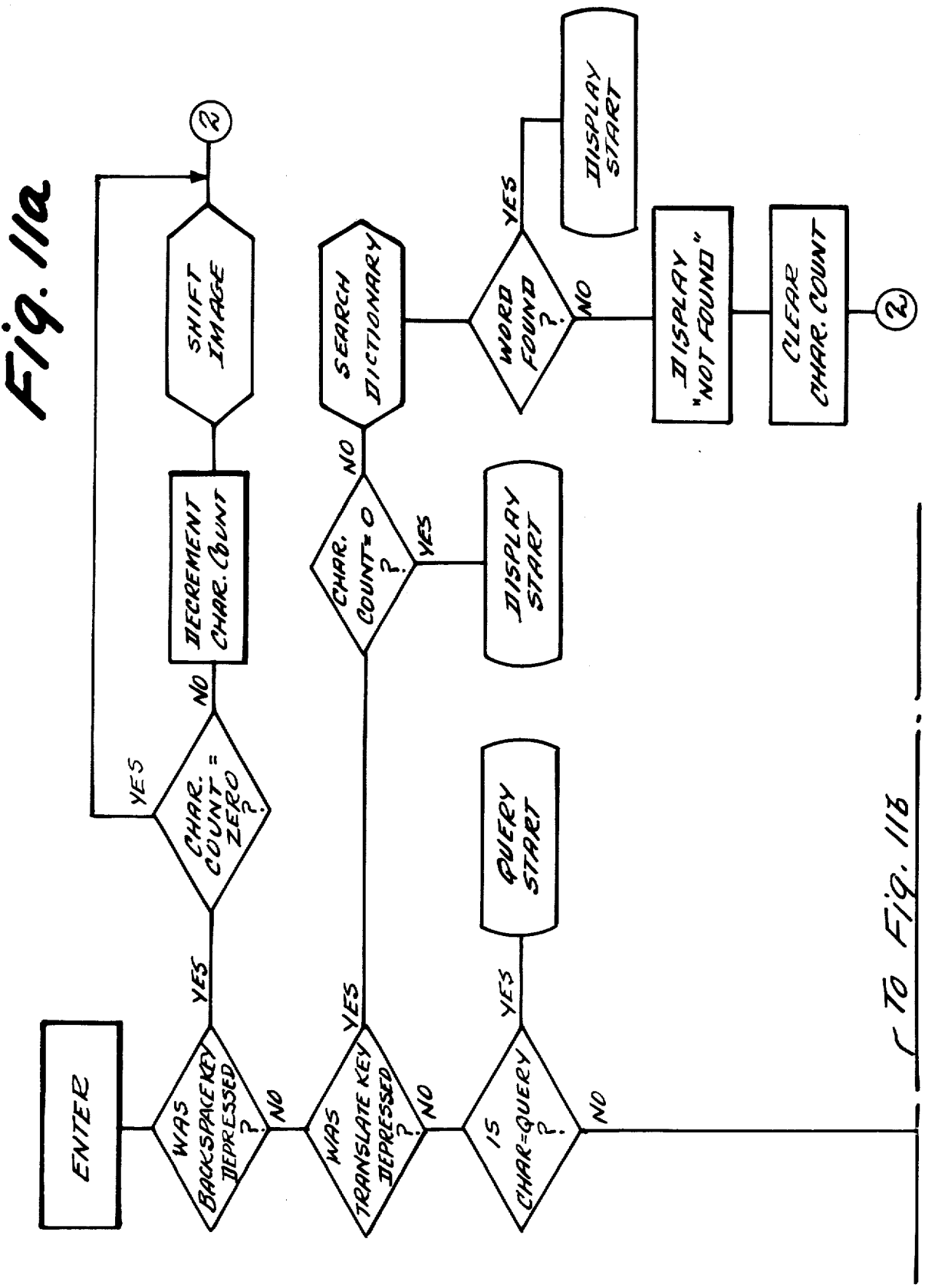

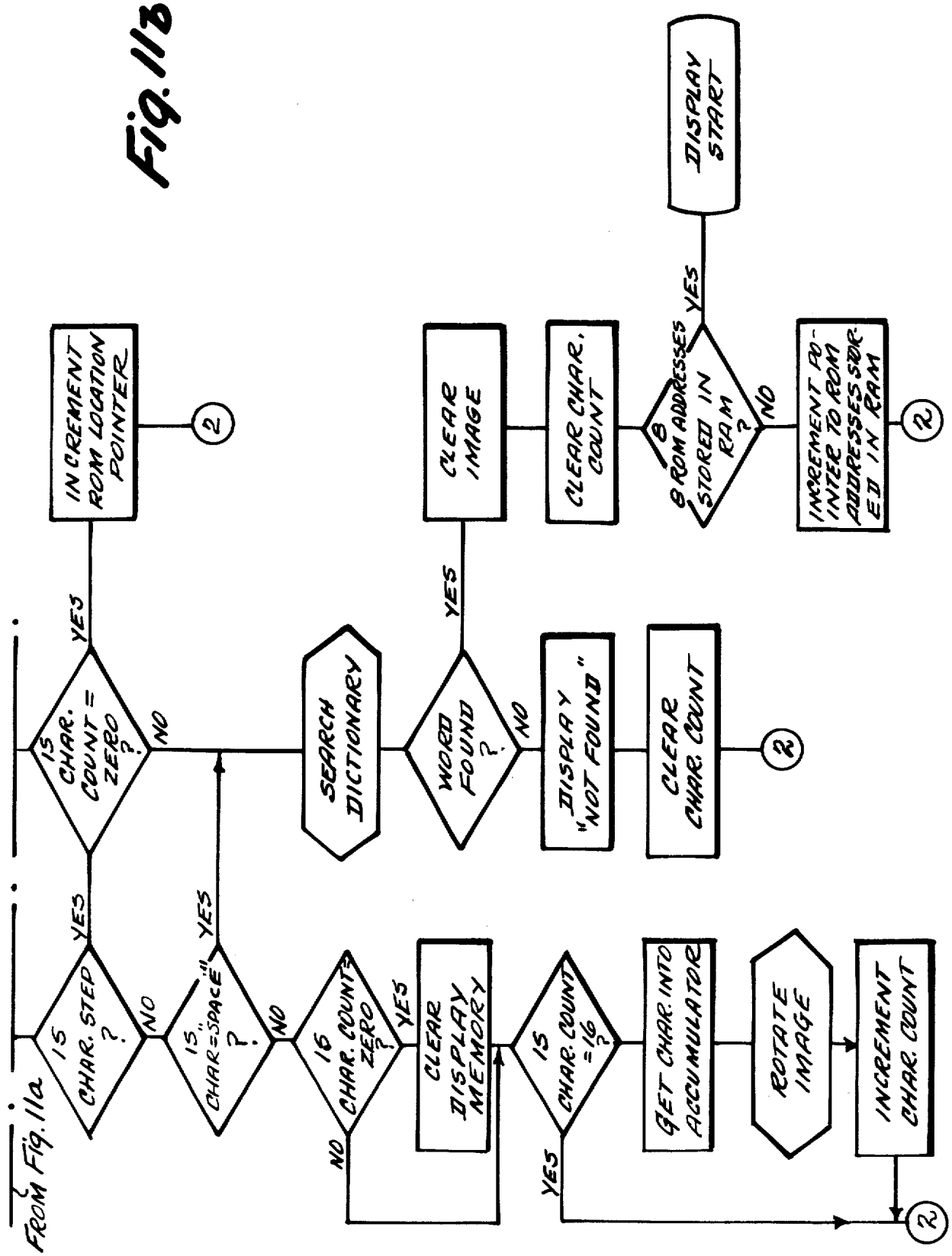

ELECTRONIC DICTIONARY AND LANGUAGE INTERPRETER

BRIEF DESCRIPTION OF THE BACKGROUND AND SUMMARY OF THE INVENTION

The present invention is a continuation-in-part of Ser. No. 723,049, filed Sept. 13, 1976 now abandoned.

The invention relates to a portable, self-contained information storage apparatus into which a sequence of alpha-numerical characters can be entered via a keyboard and an associated stored sequence of characters displayed, e.g., defining a foreign language translation of an entered word.

The discovery that information can be stored external to the brain and retrieved when desired is one of the fundamental bases on which civilization rests. In general, the storage of information is accomplished by causing physical, chemical or electrical changes in different parts or portions of some object or material. The locations (i.e., addresses) of the changes are maintained separately to permit retrieval of the stored information, the efficiency and reliability of the storage and retrieval determining the effectiveness of the storage mechanism.

Printed dictionaries, phone books and the like are basic types of information storage devices which have been in use for centuries and which will continue to be useful. However, for many situations, information from such printed records cannot be retrieved either quickly or efficiently. Whenever a number of associated sets of information are to be sequentially retrieved, use of a printed dictionary, phone book or the like is a time-consuming and tiresome task. One activity where this is particularly true is in locating translations of words for use in either learning a foreign language or in immediately communicating in that language, defining terms unique to some technical subject or specialty, and the like. In learning a language, frequent interruptions of reading to look up definitions of foreign words not only increases the time required to complete the reading, but interrupts the concentration which is needed to efficiently learn the foreign language. To locate in a printed book a translation for immediate oral communication is often difficult because of poor light, distractions such as noises and vibrations, etc. Even when located, pronunciation may be difficult and the book difficult to show to a foreigner. Making word combinations requires looking up several entries and somehow putting the entries together.

Of course, many inventors have sought in the past to provide more efficient information retrieval and such devices are well known in the digital computer art. For example, the patents to Ooba et al, U.S. Pat. No. 3,612,676, Philipp, U.S. Pat. No. 3,457,010, Ashley, U.S. Pat. No. 3,414,985, Papayannopoulos, U.S. Pat. No. 3,302,513, and Rocca, U.S. Pat. No. 2,690,697, all disclose devices in which strips of microfilm having a plurality of discrete regions each with a word definition reduced in size are indexed to a given location and the discrete region at that location displayed. Operating a keyboard to form a certain sequential combination of letters defining a word causes either the filmstrip or microfilm to be moved in line with the light source to project an image onto the screen or the light source to be moved to project light through a given part of the microfilm. These devices are inherently bulky, complex and expensive because of the need for mechanisms to locate and project an image through the correct portion of the film, and thus are not suitable for most uses.

Computers of all sizes are of course information storage and retrieval devices. In recent years, microelectronic elements have been perfected which permit computers to be packaged in portable units which have internal storage and programs. Hand-held calculators are one type of such portable units, and many varieties of hand-held calculators, some with programmable memories, are available. For example, U.S. Pat. No. 3,859,635 to Watson et al, and U.S. Pat. No. 4,012,725 to Spangler et al describe two complex microelectronic calculators.

The patent of Kyriakides et al, U.S. Pat. No. 3,932,859, describes an electronic dictionary which is designed to be a portable, hand-held unit with plug-in memory modules which can be accessed by the keyboard. A display is provided on the hand-held unit for displaying retrieved definition. According to the disclosed embodiment of the Kyriakides et al patent, a counter provides an output indicating the number of characters which have been entered to form a given word. After all the characters forming the chosen word have been manually entered into the keyboard, a definition key on the keyboard is operated which in turn enables a clock which provides a pulse train which is applied to the counter to provide an output indicating the stored count. The output of the counter and a storage indicating which characters have been entered are then applied to decoder logic which forms an address for a definition which is then retrieved and conventionally displayed.

The present invention relates to an electronic information storage apparatus which superficially resembles a hand-held calculator of the type generally described above and widely available. However, the present invention differs from such conventional calculators in that it includes unique structure which provides for efficient and rapid retrieval of information which is stored in a plug-in module which can be readily changed to change the stored information. The present invention is not a general purpose computer which is programmed by software, but rather a combination of elements, preferably microelectronic elements, which carry out certain instructions permanently stored in a memory as firmware while the functions are carried out. The unit is designed to provide a multiplicity of desirable functions from a combination of elements which can be assembled and sold relatively inexpensively, and which operate with a high degree of reliability. The present invention thus has capabilities and structure which are quite different from anything found in conventional hand-held calculators or similar devices.

The present invention finds particular utility as an electronic dictionary in which pairs of "source" words and "translation" words are stored as entries in a plug-in read/only memory (ROM). Thus, one sequence of each pair might be an English word and the other sequence a translation of that word in French so that the electronic dictionary with that plug-in module operates as an English/French or French/English dictionary. Through proper manipulation of keys on a keyboard of the hand-held unit, a word entered in the keyboard can be displayed on a plurality of conventional displays and compared with either the source word or the translation word of each of the respective pairs unit a match is found. Upon an appropriate command, produced by manual operation of one or more keys, both the source and translation of the match can be displayed.

The present invention further includes within the hand-held housing a central processing unit, a read/write memory, preferably a random access memory, and a second read/only memory (ROM) which stores instructions for carrying out searches of the memory in the first ROM and searches of the keyboard for entered alpha-numeric characters, as well as controlling the display. These elements are preferably formed on a single microcomputer semiconductor chip to provide a simple and unique combination.

The ability of the present invention to translate phrases further increases its utility. As many as eight words of a source language may be entered at one time. As each word is entered a search is conducted for its match in the plug-in ROM. After the last search, upon an appropriate command, first all of the source words followed by all the translations of the source words are displayed.

In any information retrieval device, it is desirable to have the flexibility to display varying numbers of words of variable length so that each definition, e.g., is not constrained to a small number of characters. At the same time, it is desirable in the present invention to make the device as small and compact as possible. This latter desire can be best carried out by limiting the number of display units, each of which displays a single character. In the present invention it is desirable to limit the number of displays to 16.

The present invention resolves this apparent conflict between the desire for a small number of individual display units and the need for flexibility in order to display, when necessary, a number of characters in excess of the number of displays. This is accomplished by varying in time the display of individual characters of the sequence pair after the matches are found. More particularly, according to the present invention, the individual characters comprising first all of the source words followed by all of the translation words to be displayed are sequentially advanced, e.g., rolled across the display. This is accomplished by storing in one set of locations in the RAM forming part of the microcomputer, each of the characters currently being displayed and storing in a second location the locations in the plug-in ROM where pairs of source and translation words to be displayed are found.

In order to provide maximum flexibility in the present invention, either sequence of the pair of sequences comprising each entry in the plug-in ROM can be the word which is compared with an alpha-numeric sequence entered in the keyboard. Thus, in an English/French dictionary, an English word can be entered, and compared with one sequence of each pair. By operation of one of the manual keys, the other words of each pair can alternatively be searched. In this latter case a French word can be entered and its English "translation" found. Both sequences of each pair of sequences found to match are preferably displayed upon operation of a definition key.

The unique apparatus of the present invention can be operated in any of a number of modes according to instructions which are stored as firmware in the second read/only memory (ROM) forming part of the microcomputer. In addition to the search routine described above, in which source words are entered in the keyboard, compared with one of a plurality of pairs of sequences in the plug-in ROM to ascertain if a match exists, with that matching pair then being displayed, the device can operate as a calculator with the calculator instructions being also stored in the ROM of the microcomputer, and the device being shifted into the calculator mode by operation of a key on the keyboard.

The invention also can be operated in a QUERY mode in order to check the spelling of a word or to retrieve all of the stored words which include certain combinations of letters. After the QUERY key is depressed, as much of the word as desired can be entered with blank spaces left for letters not identified. The ROM module is then searched with all combinations having the entered letters at the entered locations being sequentially displayed.

Many other objects and purposes of the invention will be clear from the following detailed description of the drawings.

BRIEF DESCRIPTION OF THE DRAWINGS

FIG. 7 shows the character generation table;

FIGS. 11a,b show a flow diagram of the ENTER subroutine;

DETAILED DESCRIPTION OF THE DRAWINGS

I. HARDWARE DESCRIPTION

Figure 1:
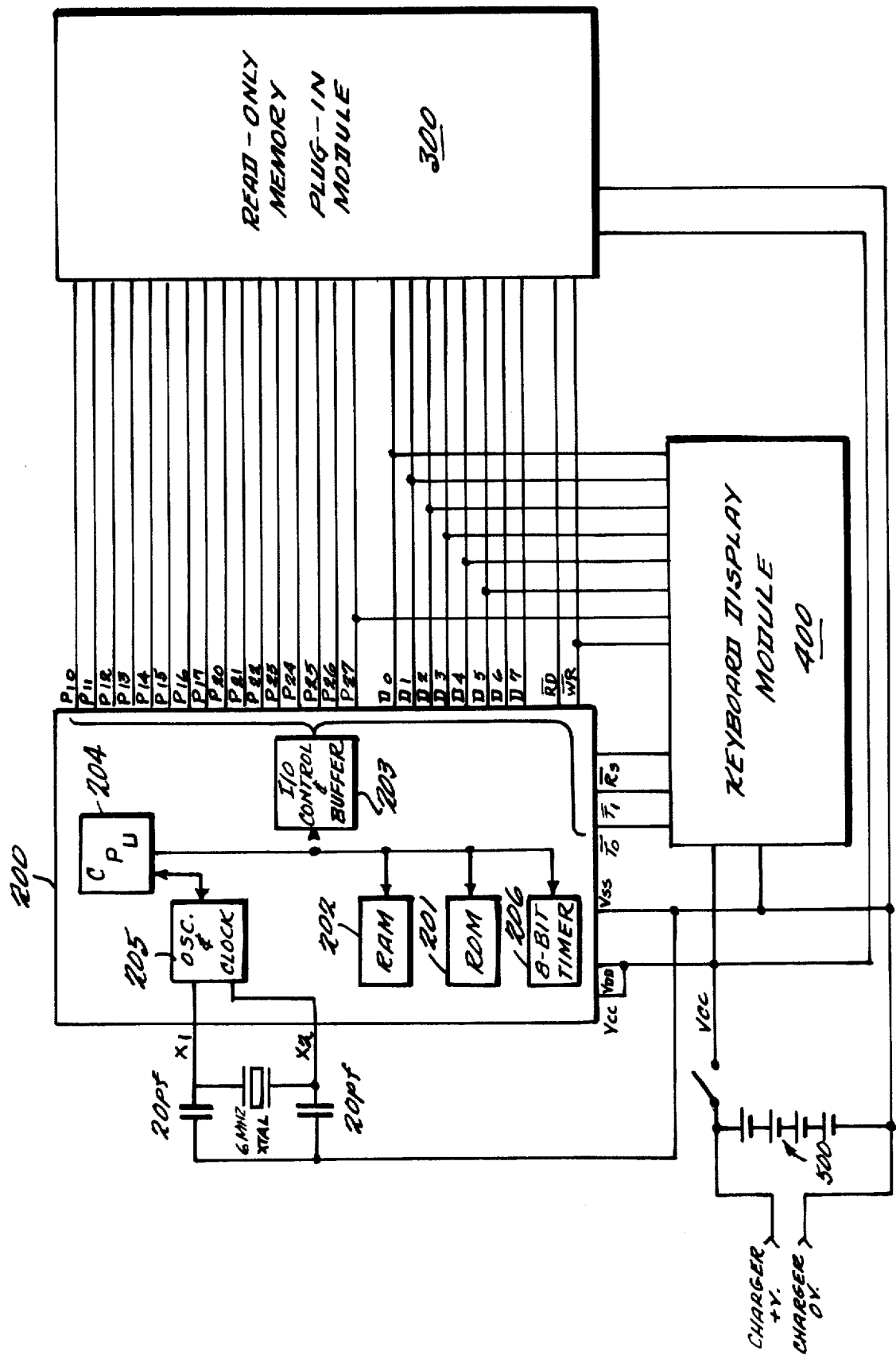
FIG. 1 shows a schematic view of components of the invention including a microcomputer, ROM plug-in module, and a keyboard-display module.

Reference is now made to FIG. 1, which illustrates the basic components of the present invention including a microcomputer chip 200, read/only memory (ROM) plug-in module 300, keyboard display module 400, and a conventional rechargeable battery forming a voltage source 500. Mircrocomputer chip 200 provides unit intelligence through an internally stored program which monitors the keyboard, refreshes the display, performs calculations in the calculation mode, searches for and finds entered words and corresponding translations in memory. The program instructions are stored in an on-board ROM as firmware; physical changes occur at unique physical locations which result in the structure having certain functions. While any suitable commercially available microcomputer chip may be used, a custom chip is preferred for large scale production. The Fairchild Model F8 and the Intel Model 8048 are satisfactory commercial microcomputers.

The chip conventionally contains a 1024×8 bit program memory (ROM) 201, a 64×8 bit random access data memory (RAM) 202 which serves as a read/write memory, 27 Input/Output lines fed by I/O control and Buffer logic 203 and an 8 bit central processing unit 204, in addition to an on-board oscillator and clock generator circuit 205 and timer 206. Microcomputer 200 is capable of carrying out approximately 95 conventional instructions (for example, see *MCS-48 Microcomputer User's Manual*, by Intel). These instructions are well known and not detailed herein, but can be easily assembled to carry out the desired functions, e.g., as detailed in FIGS. 9-16. Use of these instructions in the firmware program stored in the on-board program storage ROM 201 allows the microcomputer to serve as a controller for the electronic dictionary.

The 64 word read/write memory (RAM) 202 in microcomputer chip 200 serves as a display memory, a memory for the various pointers to be described below and the miscellaneous temporary storage required by the program. 8-bit timer 206 interrupts the central processor every 80 microseconds and every twelfth interrupt causes the next display position to be refreshed and the next keyboard column to be scanned (approximately once every millisecond), as will be described below. Oscillator and clock circuits 205 interface with the external 6 MHz crystal and provide the two-phase clock required by the chip's internal circuitry.

Central processor unit 204 performs all instructions stored in the program memory, manipulating and storing data and controlling Input/Output transfers. The Input/Output (I/O) logic 203 buffers data and controls signals entering and leaving computer 200. The I/O signals are as follows:

| Designation | Function |
| --- | --- |
| $V_{SS}$ | Circuit ground potential |
| $V_{DD}$, $V_{CC}$ | +5V supply voltage |
| $P_{10}$-$P_{17}$(Port 1) | 8-bit quasi-bidirectional port. |
| $P_{20}$-$P_{27}$(Port 2) | 8-bit quasi-bidirectional port. |
| $D_0$-$D_7$ | True directional port which can be written or read synchronously using the RD, WR strobes. The port can also be statically latched. |
| $\overline{T_0}$ | Input pin used by microcomputer 200 to test whether a key in Row 0 has been dispersed. |
| $\overline{T_1}$ | Input pin used by microcomputer 200 to test whether a key in Row 1 has been dispersed. |
| $\overline{RD}$ | Output strobe activated during a microcomputer 200 read operation. Used as a read strobe to external data memory. |
| $\overline{RS}$ | Input which is used to initialize the processor. |
| $\overline{WR}$ | Output strobe during a microcomputer 200 write operation. Used as a write strobe to external data memory. |
| $\overline{X_1}$ | One side of crystal input for internal oscillator 205. |

-continued

| Designation | Function |
| --- | --- |
| $\overline{X_2}$ | Other side of crystal input. |

Figure 2:
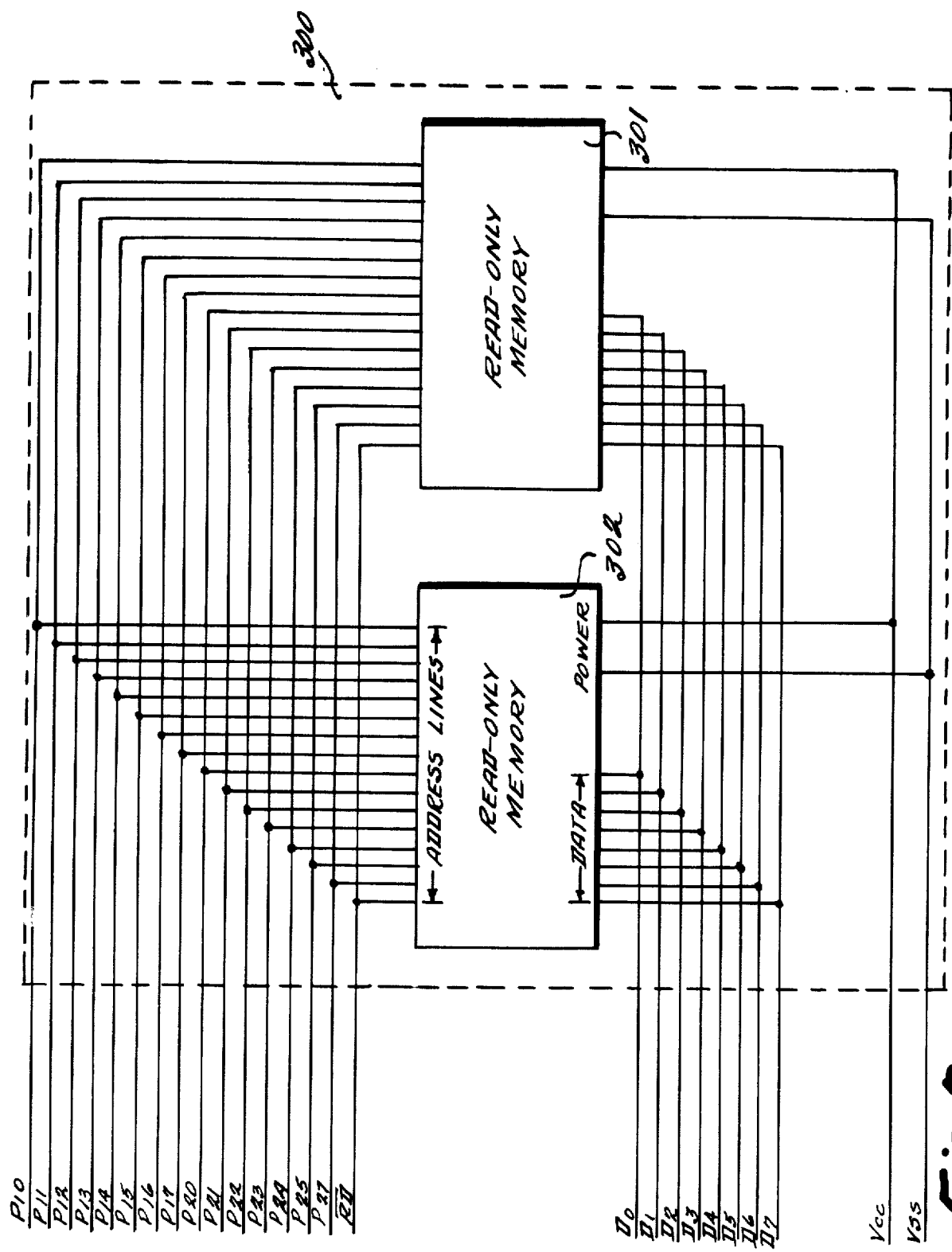
FIG. 2 shows a schematic view of the ROM plug-in module.

The read/only memory (ROM) plug-in module 300 detailed in FIG. 2, stores the translation or dictionary table which microcomputer 200 searches for the appropriate entry. Each entry is a pair of alpha-numeric sequences, one sequence being, the source word and the other being the translation. Both sequences can be displayed following a match as described below.

Module 300 preferably consists of two mask programmed 65,536 bit memories 301 and 302, each organized as 8,192×8 bits, giving a module capacity of 16,384 alpha-numeric characters. Based on an average of 12 characters per source word and translation word, each module has an average capacity of 2,730 words (1,365 source and 1,369 translation words). The average word capacity of module 300 can be doubled by including four memory chips instead of the two illustrated in FIG. 3. Each memory chip, e.g., chip 301, can be any of the standard read/only memories, such as the MM 5235 N-channel metal gate device manufactured by National Semiconductor. Module 300 is a small assembly which is easily plugged into and removed from the unit without the use of tools. The ROM modules are made easily replaceable since it is contemplated that the unit can be changed from one language or type of dictionary to another by simply changing the ROM, e.g., from English/French to German/Italian. Thus, each language or dictionary table will require a unique set of two ROMs, e.g., 301 and 302.

Address lines $P_{10}$-$P_{24}$ select one of the 8,192 characters stored in each ROM 301 and 302. Chip select line $P_{25}$ selects the correct ROM of the two, $P_{27}$ enables the selected ROM, and $\overline{RD}$ places the selected character from the selected ROM on the data lines $D_0$-$D_7$ to be read by microcomputer 200.

Figure 3:
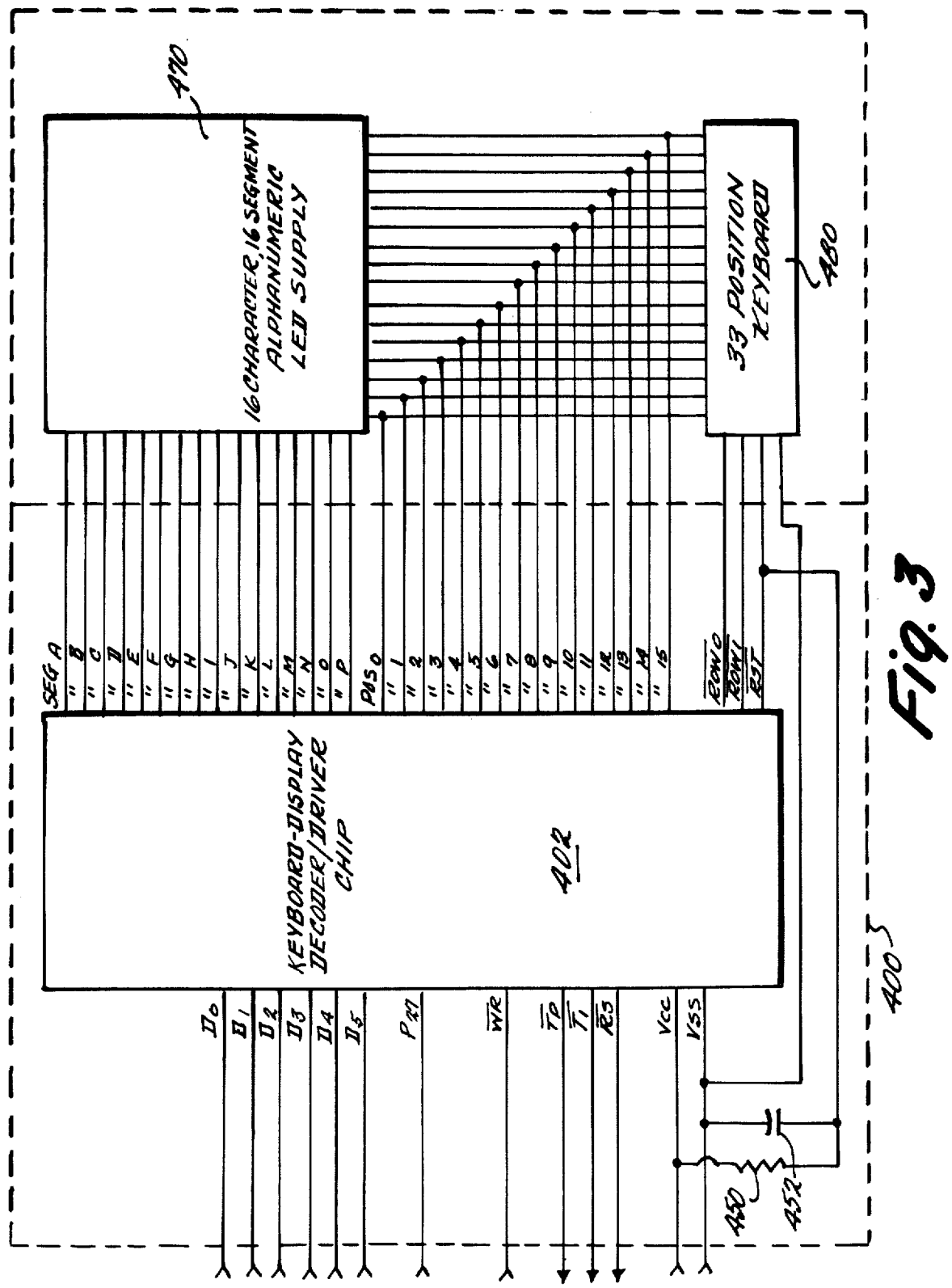
FIG. 3 shows a schematic view of the keyboard-display module.

The keyboard-display module 400 detailed in FIG. 3 consists of the keyboard-display decoder/driver chip 402, the 16 character, 16 segment alpha-numeric LED display 470, the 33-position keyboard 480 and the initial start-up circuit consisting of resistor 450 and capacitor 452. Chip 402, represented in detail in FIG. 4, consists of a hex character code latch 404, a 16-segment generator 406 (a read/only memory capable of storing patterns for 64 displayable characters), a 16-segment anode driver 408, a 16-bit character/column select shift register 410, a 16-character LED common cathode/keyboard column select driver 412. Although a custom chip is used in this exemplary embodiment, individual components such as in FIG. 4 may alternatively be used.

Figure 4:
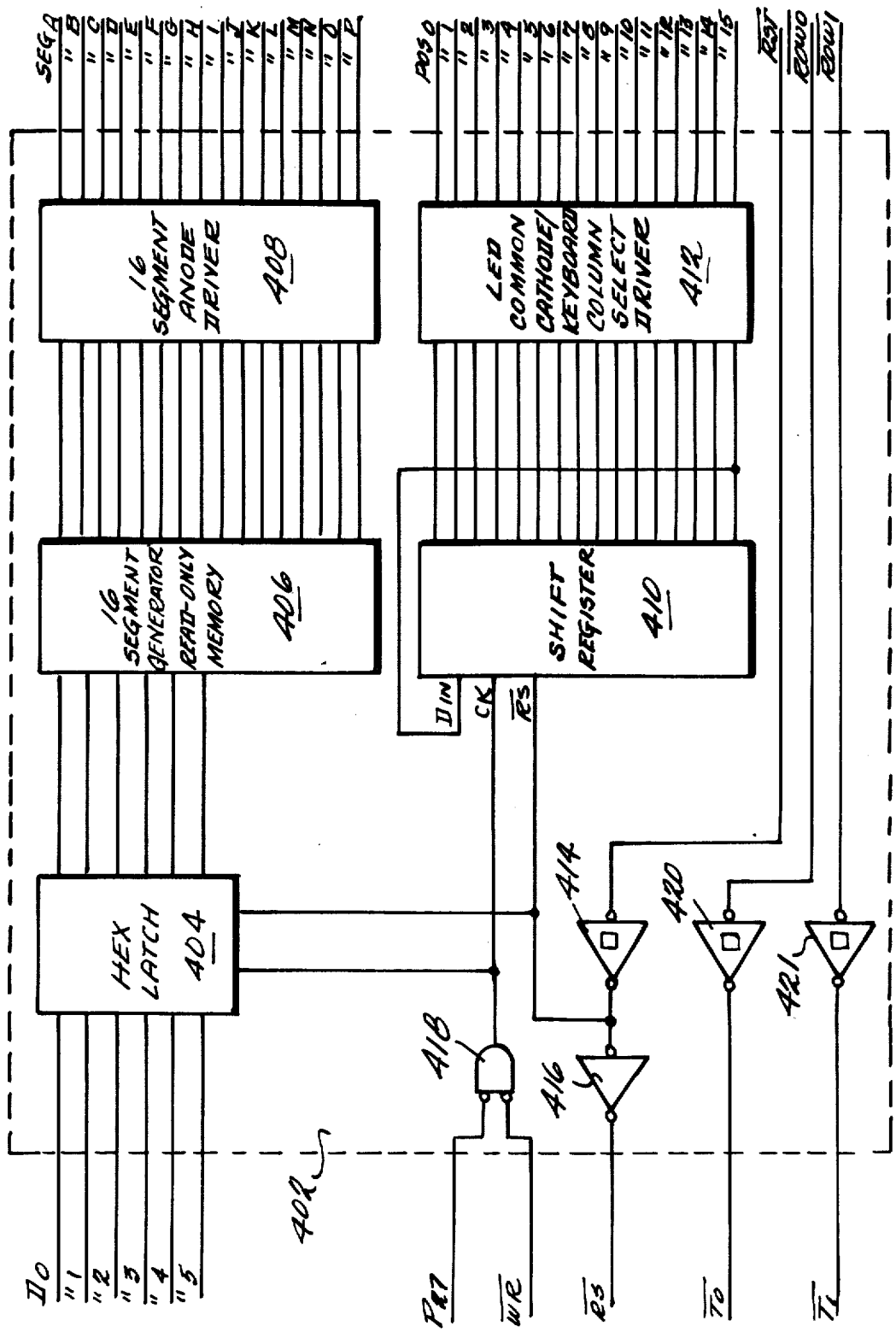
FIG. 4 shows a schematic view of the keyboard-display decoder/driver chip.

The $\overline{RST}$ signal in FIG. 4 is generated by the RC start-up circuit, resistor 450 and capacitor 452 in FIG. 3, or by depression of the clear key 486 of keyboard 480 in FIG. 5. It generates, through buffers 414 and 416, the $\overline{RS}$ signal which resets the microcomputer 200, sets the character latch 404 to a "space" code (i.e., a blank display), sets the shift register 410 to a value associated with the first displayable character position, and causes the entry of a given message identifying the contents of module 300, e.g., English/French, in the display memory area of RAM 202. Upon resetting of module 300, e.g., English/French, in the display memory area of RAM 202. Upon resetting, the microcomputer program sets its display character pointer in RAM 202 (see FIG. 8) to the first position and from then on tracks the position from $POS_0$ to $POS_{15}$. Once per millisecond the next character to be displayed is loaded from the display memory area of RAM 202 over data lines $D_0$–$D_5$ into the hex latch 404 by $P_{27}$ and $\overline{WR}$ logically combined in AND gate 418. This signal also advances shift register 410 to the next character display position. When the display position becomes $POS_{15}$ (the last position), a line between the $POS_{15}$ output and the data input (DIN) terminal causes the display position to become $POS_0$ on the next clock pulse. The character stored in the hex latch 404 is supplied to the ROM 406 where its 16-segment code is generated and fed to segment driver 408, for output to display 470.

The single selected bit in shift register 410 is fed to the character/column driver 412 for output to the selected character cathode in display 470 and also to the selected keyboard column of keyboard 480 as illustrated in FIG. 3. Information as to whether a key in the particular keyboard column has been depressed is fed back into chip 402 on lines $\overline{Row\ 0}$ and $\overline{Row\ 1}$ where they are sensed and buffered by buffers 420 and 421, respectively, and fed back to the microcomputer chip 200 as $\overline{T_0}$ and $\overline{T_1}$.

The 16 characters in display 470 are multiplexed in operation at a speed such that although only one character is turned on at a time, all are readable by the user because the time for the display to fade is much greater than the time between refreshings. The correct character position is selected on one of the lines $POS_0$–$POS_{15}$ from keyboard display chip 402. The segments required for the selected character are enabled on lines $SEG_A$–$SEG_P$ from chip 402.

Keyboard 480 is electrically arranged as a 2×16 array with clear key 486 (see FIGS. 5a and 5b) separately generating the $\overline{RST}$ signal. Sequences of alphanumeric characters and commands can be entered into the keyboard by sequential key manipulation. A signal is applied sequentially to each one of the $POS_0$–$POS_{15}$ lines from chip 402 to select each column in keyboard 480 in turn. If a key in that column is depressed while it is selected, the signal will be fed back on either $\overline{ROW\ 0}$ or $\overline{ROW\ 1}$ through chip 402 to microcomputer 200 for storage in RAM 202.

Figure 6:
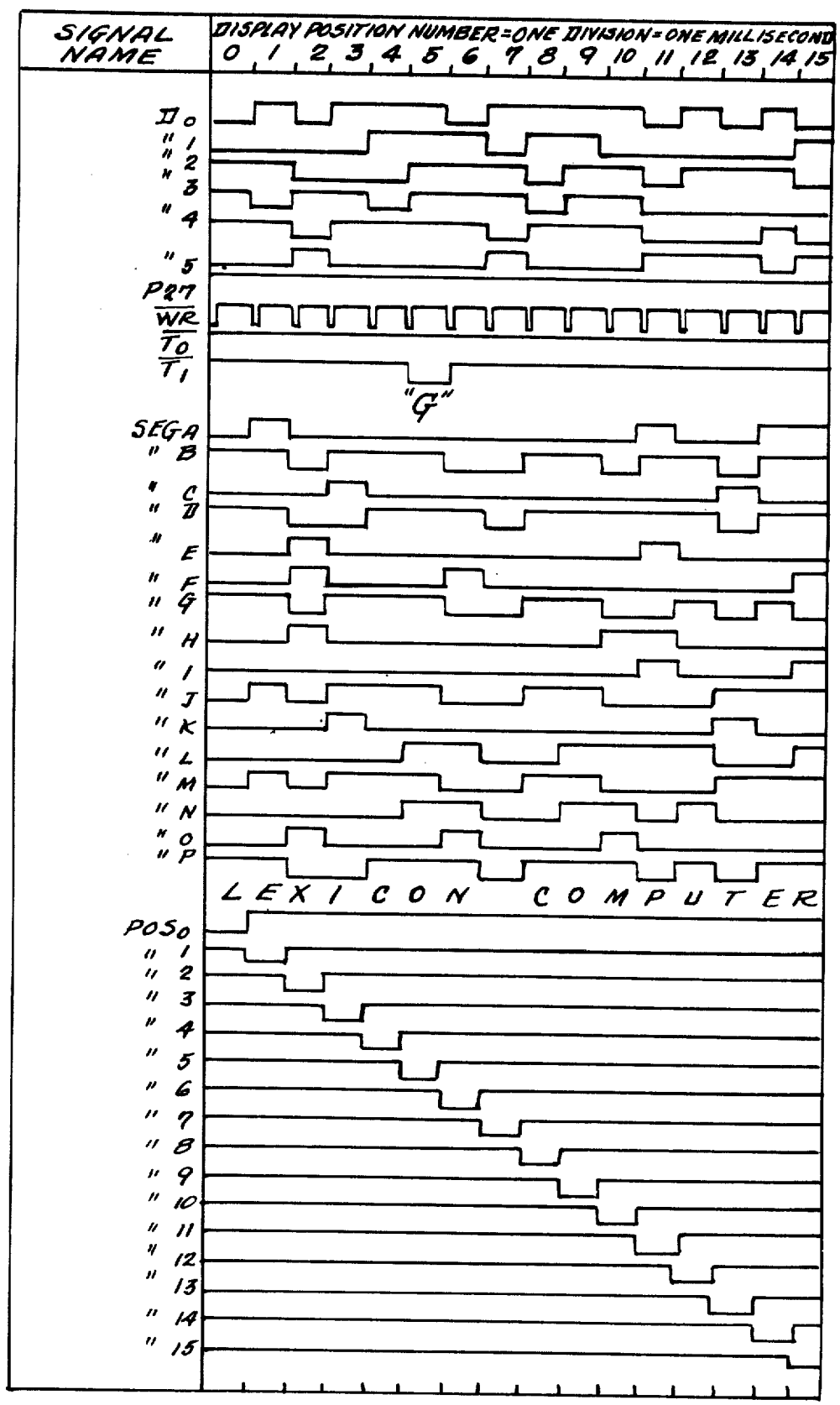
FIG. 6 shows a character timing diagram.

FIG. 6 illustrates the character timing that would occur in the circuitry illustrated in FIGS. 3 and 4 for the display of "LEXICON COMPUTER" and the depression of the "G" key. Each division of the horizontal axis represents a display refresh operation performed by microcomputer 200 approximately once every millisecond.

In time period 0, the $\overline{WR}$ and $P_{27}$ signals are logically combined in gate 418 of FIG. 4 to produce a clock signal which sets character latch 404 to the internal code for an "L", presented to latch 404, by microcomputer 200 on lines $D_0$ through $D_5$. ROM 406 translates the internal code for "L" into its corresponding 16 segment code so the anodes of the proper segments of each of the 16 characters in the display receive a high voltage. The same clock signal also advances shift register 410 so that the $POS_0$ line, connected commonly to the cathodes of the segments in the first character of display 480 becomes low. The appropriate diode segments of the first character of the display now conduct so that an "L" appears.

Similarly the clock pulse at the beginning of time period 1 latches the internal code for "E" presented by microcomputer 200 to character latch 404. The internal code is translated into the 16 segment code in ROM 406 which is presented to each character of the display. The same clock pulse advances shift register 410 so that the $POS_1$ line is low, enabling the second character of the display so that an "E" appears.

Figure 7:
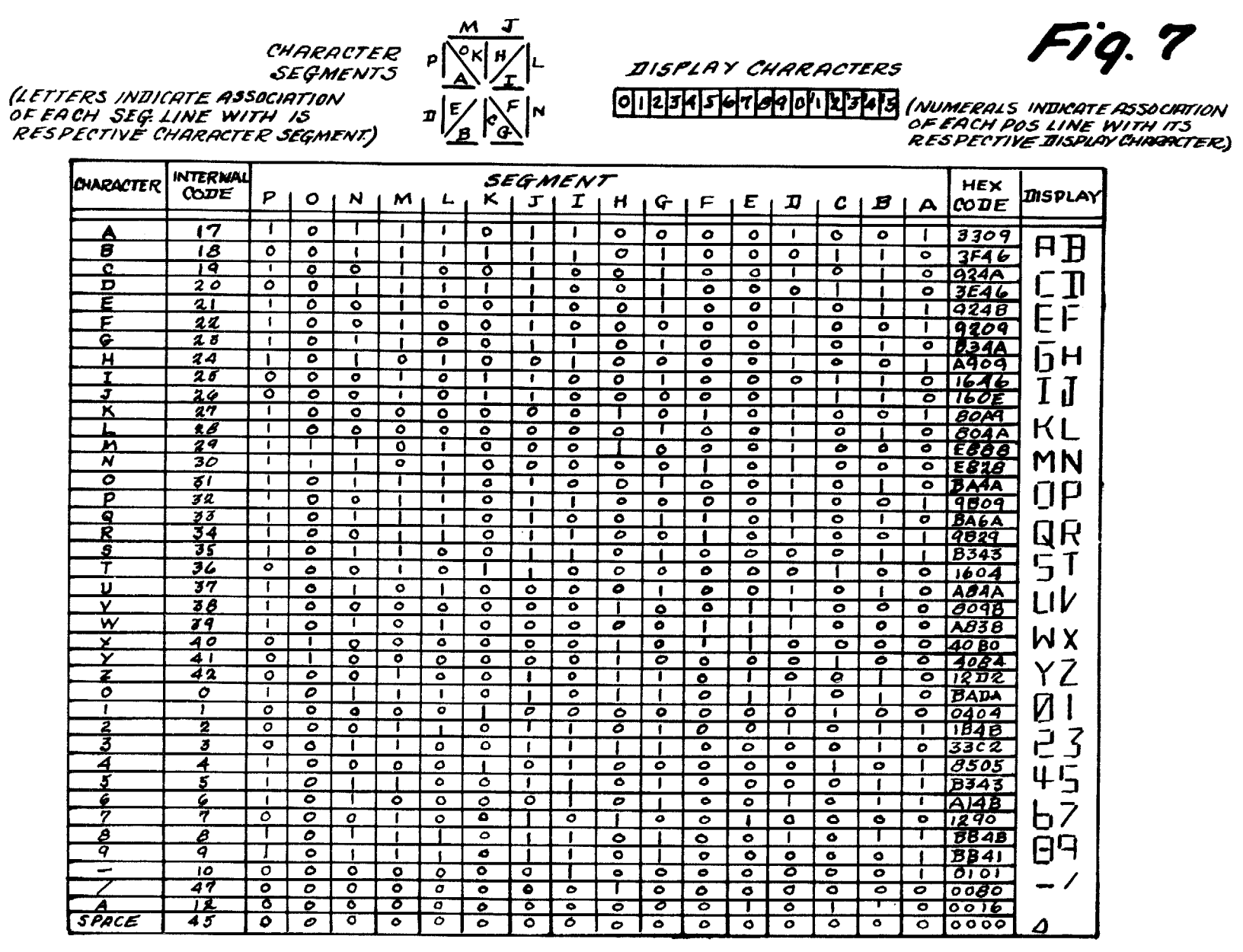

This process continues until an "R" appears in the last character of the display. Upon the next clock pulse, the internal code for "L" presented by microcomputer 200 will be latched, and shift register 410 will recycle as described above so that the $POS_0$ line will be low. This process continues, with the next character being refreshed approximately once every millisecond. FIG. 7 illustrates the hex representation of the internal code, the 16 segment code, the hex representation of the 16 segment code, and the appearance of the display for each character. It also illustrates the diode segment to which each line, $SEG_A$ through $SEG_P$, is attached, and the display character to which each line, $POS_0$ through $POS_{15}$, is attached.

As illustrated in FIG. 3 and as detailed above, lines $POS_0$ through $POS_{15}$ are connected not only to display 470 to enable the selected character, but also to keyboard 480. Each line $POS_0$ through $POS_{15}$ is uniquely associated with a column of keyboard 480 so that as each line $POS_0$ through $POS_{15}$ in turn becomes low, microcomputer 200 receives information through lines $\overline{T_0}$ and $\overline{T_1}$ that a key in the enabled column has been depressed.

FIG. 6 illustrates the signals created by depression of the "G" key. This particular key is in the column associated with line $POS_5$. When $POS_5$ becomes low, during time period 5, the depression of the "G" key causes line $\overline{T_1}$ to become low. Microcomputer 200 will translate the simultaneous occurance of a low voltage on line $\overline{T_1}$ and a low voltage on line $POS_5$ into the internal representation of "G" and store the representation in the appropriate location to be described below.

II. DESCRIPTION OF GENERAL OPERATION

The firmware for the microcomputer system is the code pattern stored in the microcomputer 200 program memory ROM 201 which provides for the intelligence of the unit, such as keyboard handling, display refresh, word translation search and calculation. The firmware can be divided into three main categories: the interrupt service, the mainline program, and the code tables.

As mentioned, the translation table is stored in ROM module 300. Each entry in the table is comprised of a pair of alpha-numeric sequences or words: the source word to be defined or translated, e.g., an English word, and a definition or translation of the source word. Each character of each sequence is stored in a "byte" of 8 bits of memory. Each byte is composed of a two-bit word mark followed by the 6 bits representing the character. The 6 character bits can represent as many as 63 different characters. The two bits of the word mark represent one of four different binary numbers. One number indicates that the following character bits represent the last character of one word sequence of the pair. Another number indicates that the following character is the last character of the other sequence of the pair. A third number represents that the following character is a normal byte, i.e., one located within one sequence or the other. The fourth binary number represents that the following character is the end of the translation table.

To look up a word, the system checks each of the bytes in sequence. The first character of the entered word is compared to the first character of a stored word, in one part of an entry. If there is a match, then the second character is checked, etc. If all characters match, then the location of entry is retrieved and stored in RAM 202 for later display. If a character does not match, then the system checks the first character of the next pair and continues until a complete match is found or the table is exhausted. If no match is found after the entire table is searched a "NOT FOUND" message is displayed.

As a part of RAM 202 in microcomputer 200, 16 bytes (hereinafter called the display memory) represent an image of the display. The mainline program can change the contents of the image. The interrupt service, once per millisecond, will select the next position of the display for refreshment. The proper image character is removed from the RAM and outputted to keyboard display chip 402. The character display pointer into the image is then incremented, in anticipation of the next refresh cycle.

The keyboard is entirely controlled by the firmware program as described above. Each entered key is debounced, translated from a row and column representation into an internal code set and then made available to the mainline program. The 16 rows of two keys each are sampled at the same time as the display is refreshed. In fact, the port which reflects the current display position also and concurrently selects the keyboard row, as illustrated in FIG. 3.

Figure 5A:
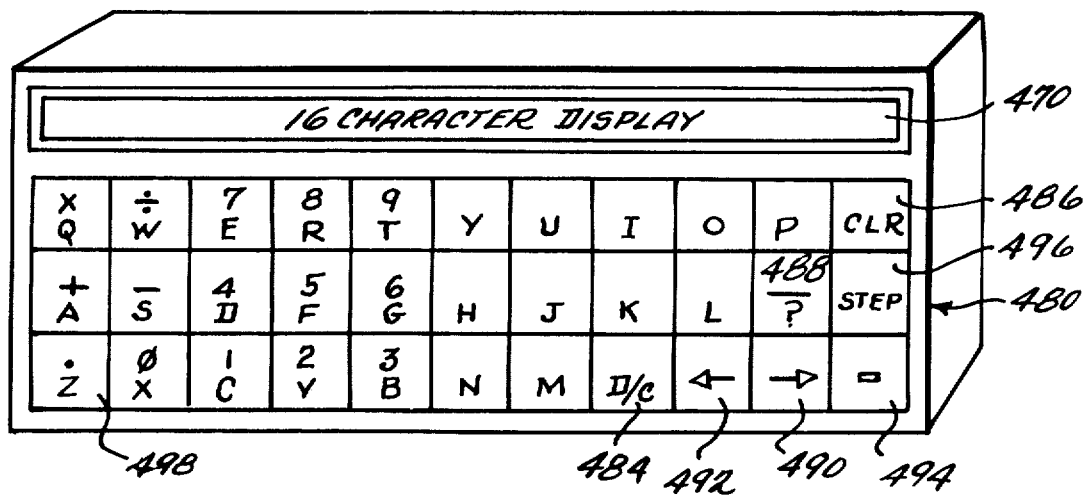
FIG. 5a shows a schematic view of the keyboard and display.
Figure 5B:
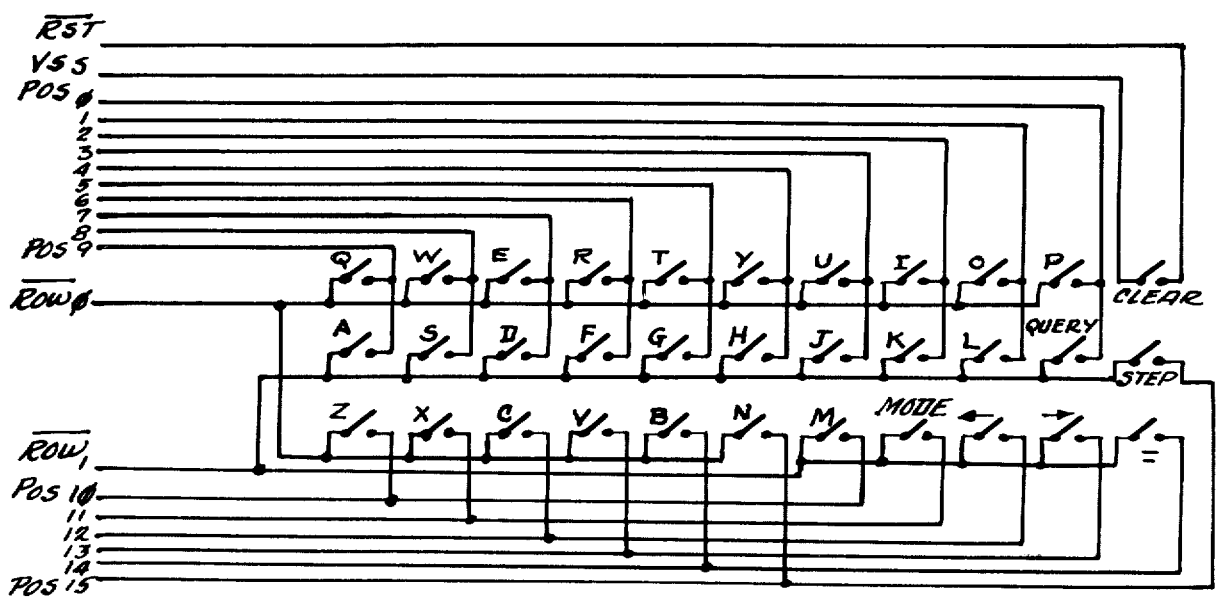
FIG. 5b shows a schematic view of the electrical arrangement of the keyboard.

The mainline program permanently stored as firmware in ROM 201 in microcomputer 200 performs the intelligent functions of the system. This program selects the current function, based on the last function key, accepts data keys, places data into the display, performs word translation, scrolls the display and performs the calculator functions. The mainline program enables the unit to be used in two major modes: the DICTIONARY mode and the CALCULATOR mode, each selected by D/C key 484 of FIG. 5a. FIG. 5a also shows one suitable arrangement of the alpha-numeric and command keys. The DICTIONARY mode also has a number of sub-modes to perform the various dictionary functions.

When the dictionary program is in the ENTER sub-mode, the user may either enter data into the display, terminate the word being entered, or select a different mode of operation. Data is entered into the display by indexing the desired keys. The displayed characters will shift one position to the left and the indexed character is inserted on the right. When backspace key 490 of FIG. 5a is entered, the displayed characters are shifted one position to the right, and the right-most character is lost. When space key 492 is operated, the displayed word is terminated, and will then be looked up in the ROM dictionary module 300. If it is not found, the words "NOT FOUND" will be displayed; otherwise, the definition or translation location in ROM 300 will be stored in the ROM module address storage area of RAM 202 (see FIG. 8). The address storage index in RAM 202 will be incremented and the word, if any, stored at that address will be displayed. When step key 496 is entered, the actions depend on whether any entry has been made to the display. If no new key has been entered, the address storage index is incremented and the word stored at the indicated address, if any, is displayed. This permits the editing of words in an entered sentence without retyping the entire sentence. If a key has been previously entered, the actions are the same as for the space key. When translation key ("=") 494 is entered, the DISPLAY sub-mode is entered and the first word is displayed. If a word has been entered into the display, it will be processed before the DISPLAY sub-mode is entered. When mode key 484 is depressed, the CALCULATOR mode is entered. When query key 488 is depressed, the sub-mode is changed to QUERY.

In the DISPLAY sub-mode, the user may examine the translation one word at a time or change modes. The display of the translation will proceed by displaying, in order, all the source words followed by all words of the translation. When translation key 494 is entered, the sub-mode is changed to SCROLL. When step key 496 is entered, the next word of either the source or translation is shifted into the display as the previous contents are shifted out. When mode key 484 is depressed, the CALCULATOR mode is entered. When any other key is depressed, the sub-mode is changed to ENTER.

When in the SCROLL sub-mode, the user may watch the display or enter another mode. The display will be constantly moving, similar to a theater marquee, with the entire source and then the entire translation entering from the right and exiting from the left. When step key 496 is depressed, the DISPLAY sub-mode is entered. When mode key 484 is depressed, the CALCULATOR mode is entered. When any other key is indexed, the ENTER sub-mode is entered.

When in the QUERY sub-mode, the user may either enter a word or partial word into the display and then examine all other words which match the entered letters, or enter another sub-mode. The user enters the letters he is sure of. Any letter position which the user is not sure of is filled by depressing space key 492. When the user has entered the letters he is sure of he depresses either step key 496 or translate key 494. All words stored in ROM 300 which have letters which match the letters entered by the user will be displayed. When step key 496 is indexed, the look-up process is begun.

The first word found in ROM 300 which matches the entry will be displayed. Words in ROM 300 which are longer than the entry, but which match the entry, as far as it goes, will be displayed. When space key 492 is depressed, the display is shifted one position to the left and the space character is entered. When searching ROM 300 later, all letters are considered to match a space. When backspace key 490 is entered, the display is shifted one position to the right, and the right-most character is lost. When query key 488 is depressed, the QUERY sub-mode is re-entered from the top. When the mode key is indexed, the CALCULATOR mode is entered. If a data key is depressed, it is placed in the display. The display is shifted one position to the left to make room for this data. No more than 16 data keys may be entered.

When in the CALCULATOR mode, the user may enter 10-digit numbers, perform addition, subtraction, multiplication or division operations, examine the current sub-total, clear the current entry or enter the DICTIONARY mode. The decimal point may appear between any two of the 10-digit positions or at either end. The most significant 10 digits of the result will be displayed.

III. FIRMWARE DESCRIPTION

Figure 9A:
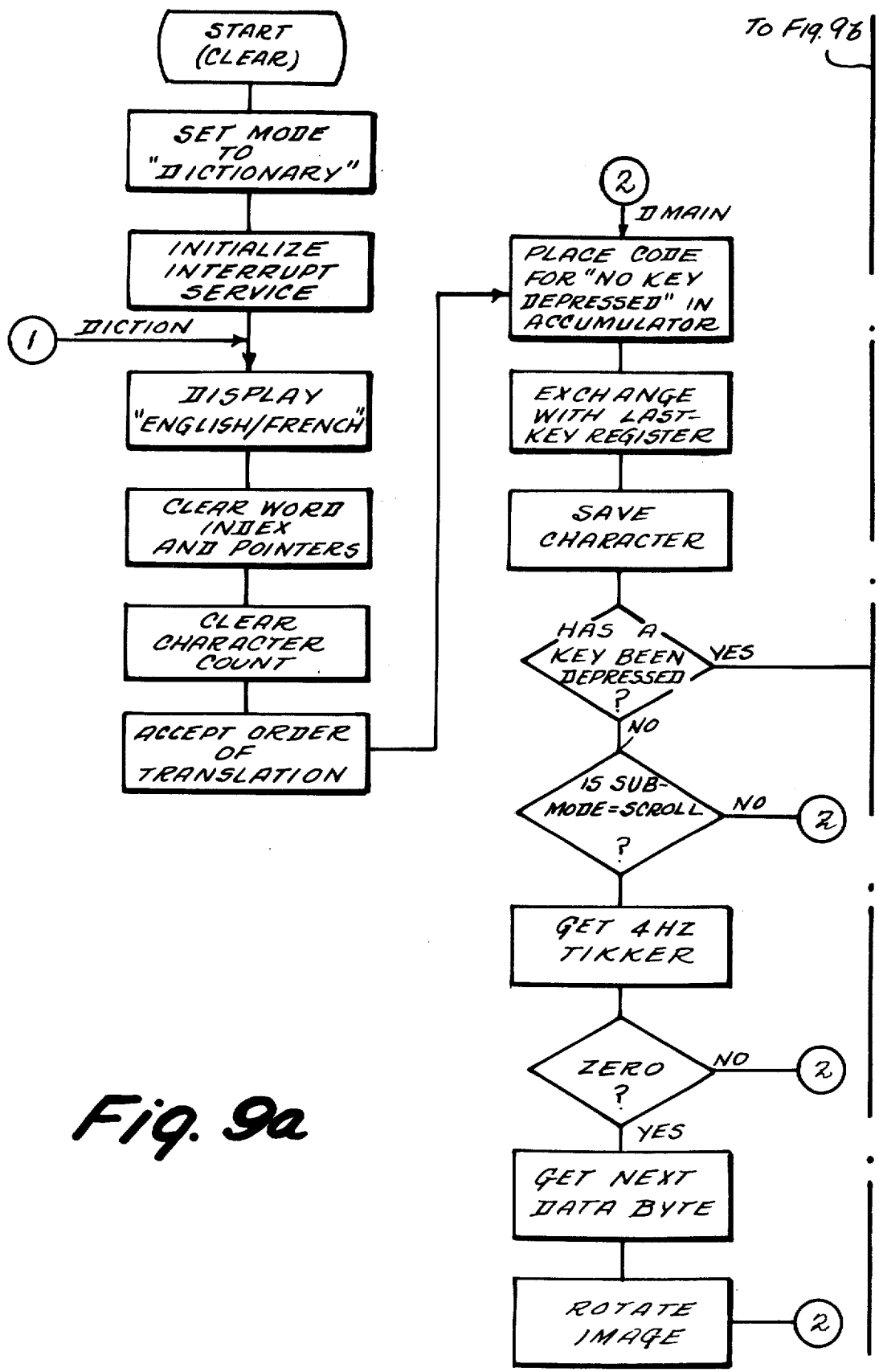
FIGS. 9a,b show a flow diagram of the subroutines that control the operation of the microcomputer when a key is depressed.
Figure 9B:
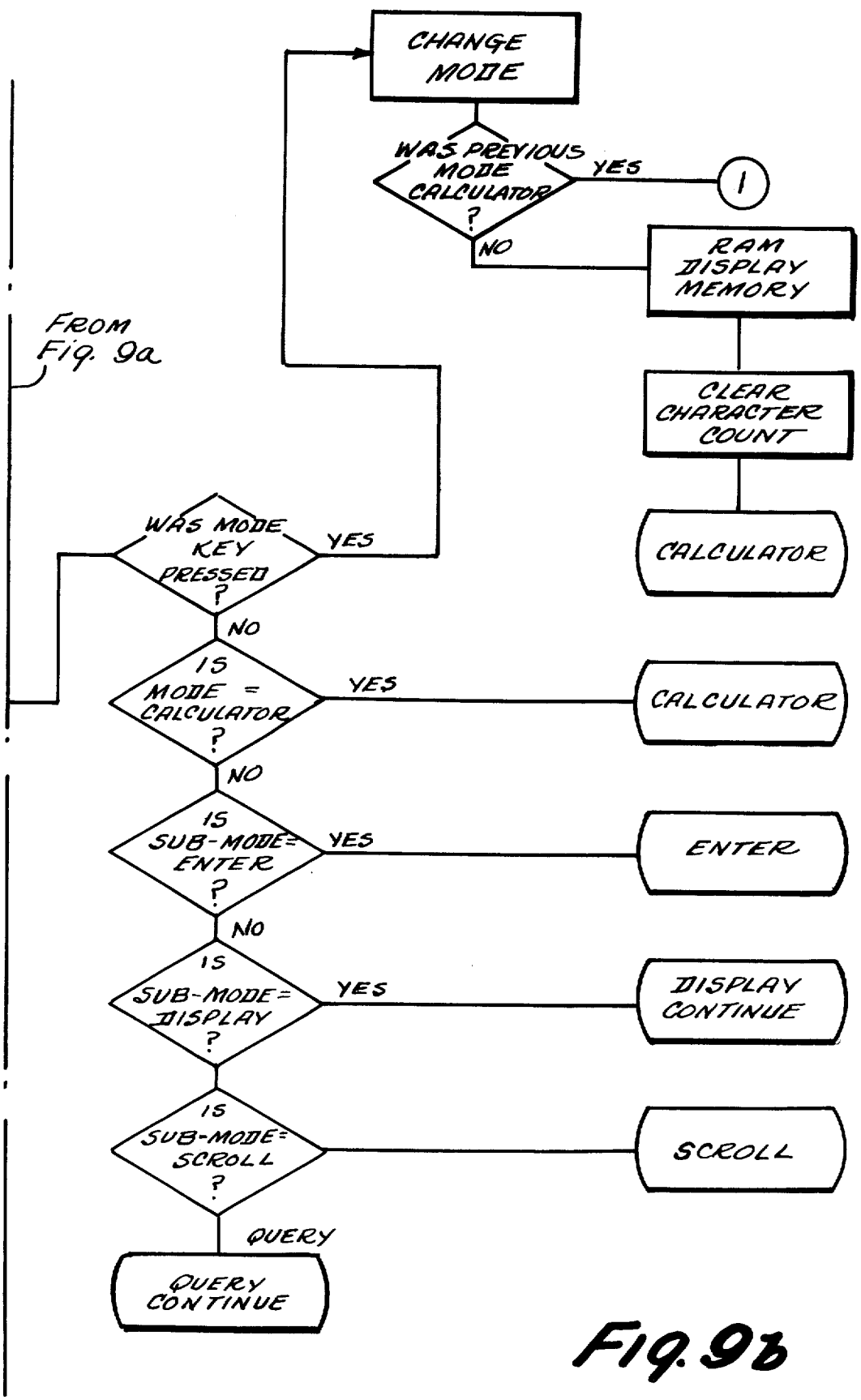

FIGS. 9–16 represent the steps that microcomputer 200 takes to carry out the functions of the electronic dictionary. FIG. 9 represents the subroutines that control the operation of the microcomputer when a key is depressed. Upon the initial powering of the apparatus, or upon the depressing of clear key 486, the DICTIONARY mode is entered and the interrupt service is initialized.

The DICTON subroutine is then entered. A given message identifying the contents of module 300, e.g., English/French, is displayed on display 470, and the word index and all pointers in RAM 202 are cleared. The character count in RAM 202, which counts the number of characters currently being displayed in display 470 is also cleared.

As mentioned above, the invention is capable of translating in either direction between the two languages stored in ROM module 300. If the module contains a translation table between English and French, the device can function either as a English/French or French/English dictionary. The order of translation can be reversed from the order indicated on display 470 by depressing backspace key 490. CPU 204 stores a representation of the order of translation in RAM 202.

The DMAIN subroutine is then entered. The 8 bit character representing that no key has been depressed is entered in the accumulator of CPU 204. When a key is pressed, the 8 bit character representing that key is stored in a register of RAM 202 called last-key. Periodically, the character in the accumulator is exchanged with the character in the last-key register. The data that has just been placed in the accumulator is also stored in a register of RAM 202 so that the information indicating the depressed key (if a key was depressed) will be available for later processing. CPU 204 then determines whether a key has been depressed.

If no key has been depressed, microcomputer 200 then checks RAM 202 to determine whether the SCROLL sub-mode has been entered. If it has not, microcomputer 200 returns to the DMAIN subroutine to determine if a key has been depressed in the meantime. If the SCROLL sub-mode has been entered, microcomputer 200 then examines the contents of a RAM register called 4 Hz Tikker, which is incremented every millisecond by a one khz clock. The register counts from 0 to 256 and then resets to 0. Thus, a period of approximately 0.25 seconds elapses before the register returns to 0. CPU 204 determines if the 0.25 second period has elasped (i.e., if the register has returned to 0). If the time period has not ended, microcomputer 200 returns to the DMAIN subroutine. If the period has elapsed, the data that is currently in the display memory of RAM 202 (see FIG. 8) is shifted to the next higher location, the next data character is retrieved from ROM module 300 and stored in the lowest order location of the display memory of RAM 202. Microcomputer 200 then returns to the DMAIN subroutine.

Once it is determined that a key has been depressed, CPU 204 first determines whether mode key 484 has been depressed. If it has, CPU 204 determines the immediately previous mode. If the previous mode was calculation, CPU 204 returns to the DICTON subroutine. If the last mode was DICTIONARY, the display memory of 202 and the character count is cleared, and the CALCULATOR subroutine is entered.

If mode key 484 was not depressed, CPU 204 then determines whether the CALCULATOR mode has been entered. If it has, the CPU enters the CALCULATOR subroutine.

If the CALCULATOR mode has not been entered, CPU 204 determines whether the apparatus is in the ENTER sub-mode. If it is, the ENTER subroutine is entered. If it is not, CPU 204 determines whether the DISPLAY sub-mode has been entered. If it has, the DISPLAY CONTINUE subroutine is entered. If it has not, CPU 204 determines whether the SCROLL sub-mode has been entered. If it has, the SCROLL subroutine is entered. If it has not, the QUERY CONTINUE subroutine is entered.

Figure 10A:
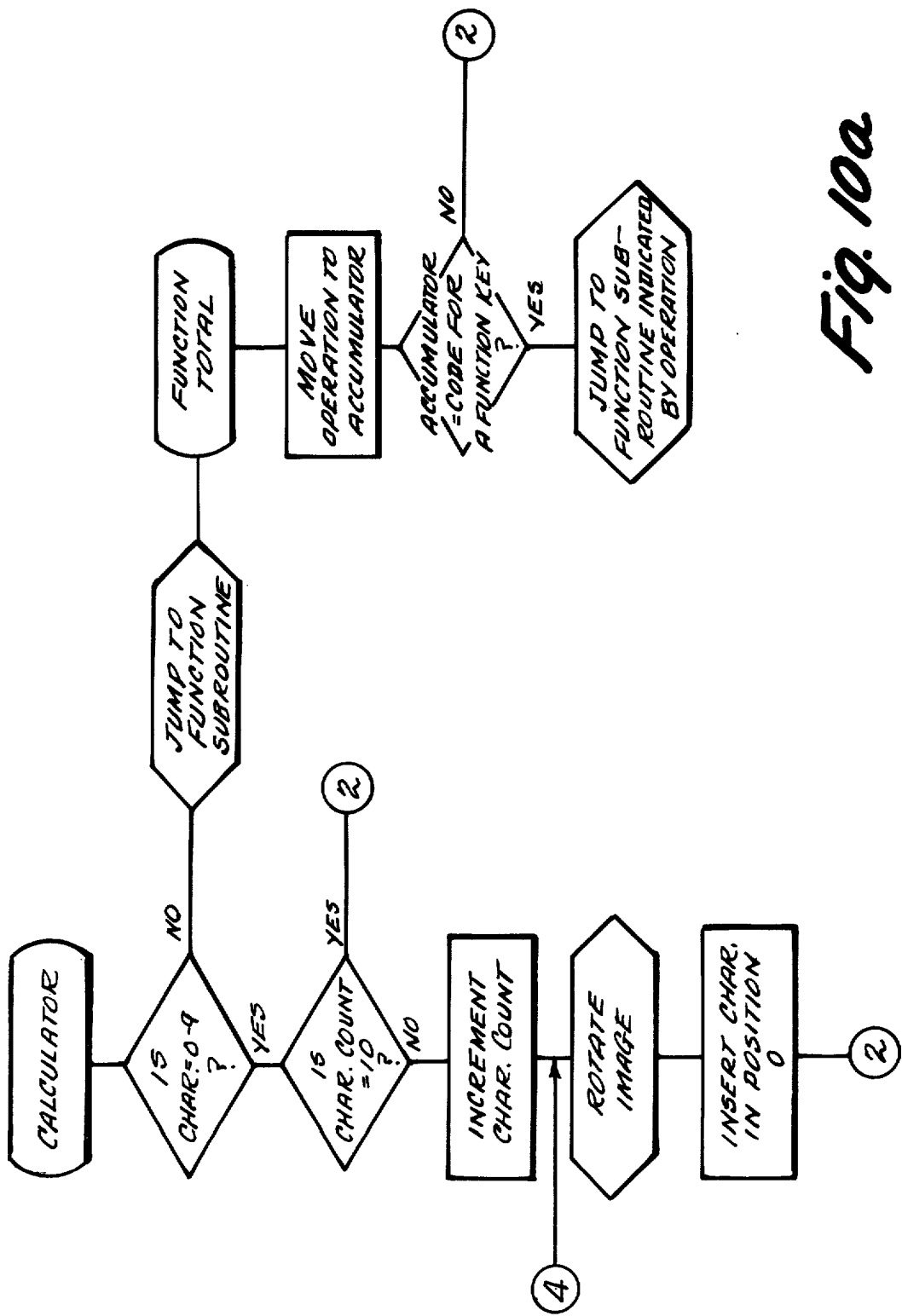
FIGS. 10a,b show a flow diagram of the CALCULATOR subroutine.
Figure 10S:
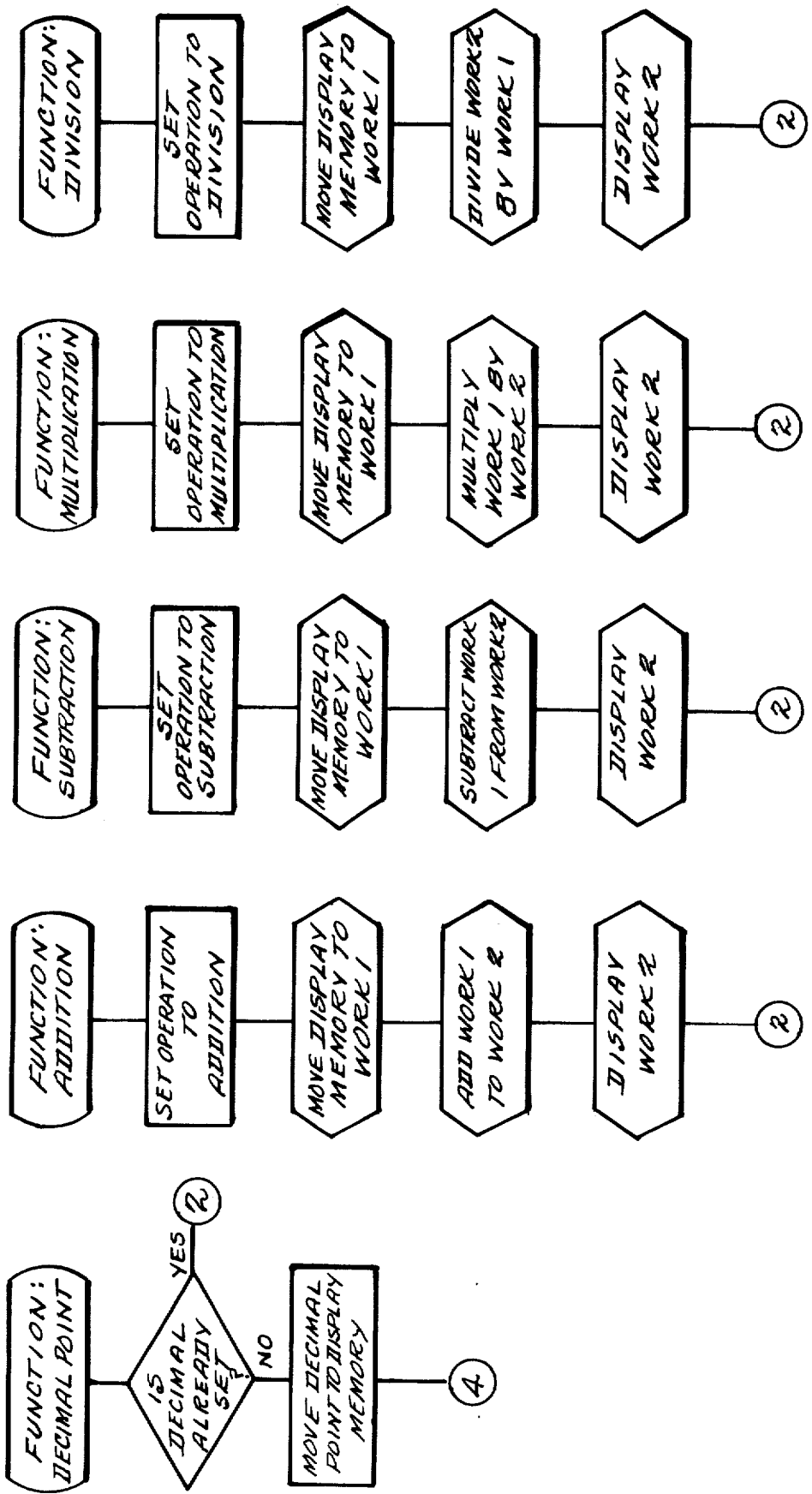

FIG. 10 details the steps CPU 204 takes to perform the calculator functions of the CALCULATOR subroutine. First, CPU 204 determines whether the depressed key is one of the numerical keys 0-9. If a numerical key has not been depressed, then one of the function keys must have been depressed, and CPU 204 jumps to the corresponding function subroutine. If one of the numerical keys 0-9 has been depressed, microcomputer 200 then determines whether 10 characters have already been entered. If 10 characters have been entered, CPU 204 does not display or store the most recent entry, since it can only operate on at most 10 digit numbers, and CPU 204 returns to the DMAIN subroutine in FIG. 9. If 10 characters have not been entered, the character count, indicative of the number of characters in the display memory, is incremented, the new character is displayed, and the new character is entered in the lowest order location of the display memory in RAM 202, after shifting the already present data to the next highest location.

If decimal point key 498 has been depressed, CPU 204 first determines whether the decimal point has been set already. If the decimal point has not been set, the character count is increased, the decimal point is displayed in display 470, the information, stored in the display memory of RAM 202, is advanced to the next highest memory location and the 8 bit representation of the decimal point is entered in the lowest order location. CPU 204 then returns to the DMAIN subroutine in FIG. 9. If decimal point key 498 has already been depressed, CPU 204 simply returns to the DMAIN subroutine in FIG. 9.

The four function subroutines are all similar in operation. A register in RAM 202 is set to indicate the indexed key. The number previously entered and stored in the display memory is moved to the WORK 1 area of RAM 202 (see FIG. 8) and stored in a compressed manner. The contents of the WORK 2 area of the RAM are then operated upon by contents of WORK 1. If WORK 2 is clear, the contents of WORK 1 are merely placed in WORK 2. The contents of the WORK 2 area are then copied into the display memory for display. CPU 204 then returns to the DMAIN subroutine in FIG. 9.

If total key 494 is depressed the TOTAL subroutine is entered. The representation of the previous nonnumeric key that was depressed is moved to the accumulator. CPU 204 then determines whether the nonnumeric key was a function key. If it was not (i.e., the key was neither a number of a function) CPU 204 returns to the DMAIN subroutine in FIG. 9. If the key was a function key, CPU 204 enters the corresponding function subroutine.

To illustrate, suppose the operator desires the result of "A"+"B". First the operation enters "A" a digit at a time. He then depresses the "+" key whereupon its code is stored in a register of RAM 202. "A" is taken from the display memory and entered in the WORK 1 area of RAM 202. "A" is then moved to the WORK 2 area since WORK 2 was previously clear. The operator then enters "B" a digit at a time. The "+" key 494 is pressed which causes the code of the previously pressed non-numeric key (i.e., the "+" key) to be placed in the accumulator. The ADDITION subroutine is then entered. "B", stored in the display memory, is moved to the WORK 1 area of RAM 202. The contents of WORK 1 (B) are added to the contents of WORK 2 (A) and the result is placed in WORK 2. The contents of WORK 2 are then displayed.

FIG. 11 illustrates the ENTER subroutine. CPU 204 first determines whether backspace key 490 has been indexed. If it has, CPU 204 determines whether the character count is zero, that is, whether there are characters already entered in the display. If no characters have been entered, the CPU returns to the DMAIN subroutine in FIG. 9. If at least one character has been entered, the character count is decreased by one, and all the data stored in the display memory of RAM 202 (see FIG. 8) are shifted to the next less significant location, with the information stored in the least significant location being lost. CPU 204 then returns to the DMAIN subroutine of FIG. 9.

If backspace key 490 has not been depressed, CPU 204 determines whether translate key 494 has been depressed. If it has, CPU 204 then determines whether the character count is zero, indicating that there is no character on the display or in the display memory. If there is no display, the CPU executes to the DISPLAY START subroutine. If a character has been entered, the CPU executes the SEARCH subroutine. If the entered word is not found in the search of ROM plug-in module 300, where the dictionary table is stored, the words "NOT FOUND" are displayed, the character count is cleared, and CPU 204 returns to the DMAIN subroutine in FIG. 9. If the word has been found in ROM module 300, the DISPLAY START subroutine is entered.

If translate key 494 has not been depressed, CPU 204 then determines whether query key 488 has been indexed. If it has, the CPU enters the QUERY START subroutine.

If the query key has not been indexed, CPU 204 determines whether step key 496 has been depressed. If it has, CPU 204 determines whether the character count is zero. If it is indicating that no characters have been entered, the pointer indicating the location in RAM 202 of the register containing the ROM module 300 address being accessed is incremented. The word stored at the new ROM module 300 address, if any, is displayed. This permits the editing of words in a sentence without retyping entire sentence. If a character has been entered, the actions are the same as if space key 492 has been depressed, as discussed below.

If step key 496 has not been depressed, CPU 204 determines whether space key 492 has been indexed. If it has, the SEARCH subroutine is entered. If the word in the display memory is not found in the ROM module 300, the words "NOT FOUND" are displayed, the character count is cleared to zero, and CPU 204 returns to the DMAIN subroutine in FIG. 9.

Figure 8:
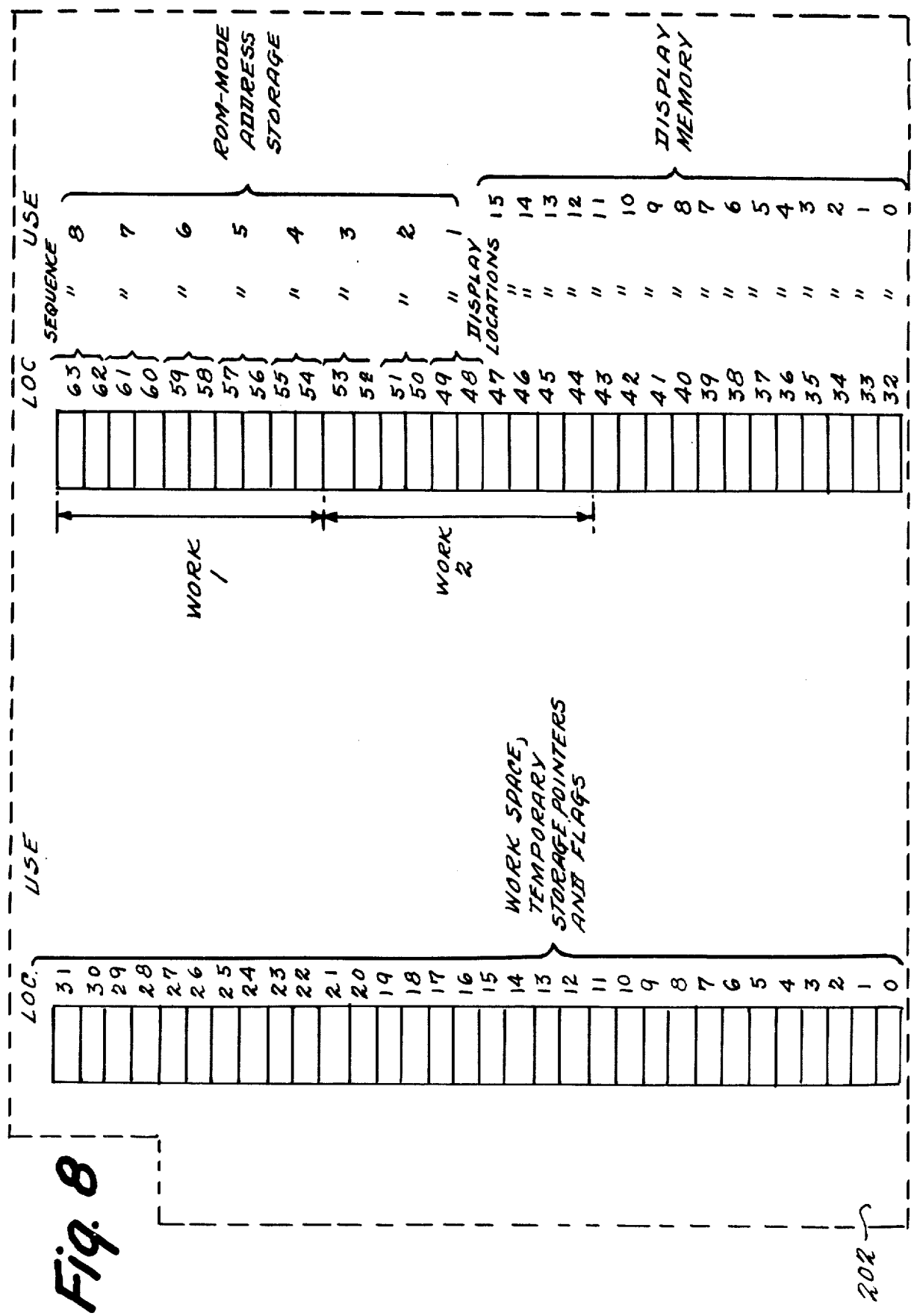
FIG. 8 shows a representation of the allocation of memory in the microcomputer ROM.

If the word has been found in ROM module 300, the address of the word within module 300 is stored in the register of RAM 202 indicated by the ROM address storage pointer of RAM 202 (see FIG. 8). The display memory and the character counter is cleared to zero.

RAM 202 is capable of storing the ROM 300 addresses of the beginning of from 1 to 8 pairs of sequences, before any of the words, translations or definitions are displayed (see FIG. 8). At this point, in the ENTER subroutine, CPU 204 determines whether 8 sequence pair addresses have already been stored. If 8 addresses have been stored, CPU 204 enters the DISPLAY START subroutine. If 8 addresses have not been stored, the ROM address storage pointer in RAM 202 is incremented and the program returns to the DMAIN subroutine of FIG. 9.

If none of the above-mentioned keys have been indexed while in the ENTER sub-mode, then one of the alphabetic keys A-Z must have been indexed. CPU 204 determines, before this character is entered into the display memory, whether the character count is zero, indicating that this character is the first character of a new word. If it is, the data in the display memory of the old word is cleared. After the display memory is cleared, or if the character count did not equal zero, CPU 204 then checks whether the character count is 16, indicating that display 470 and the display memory in RAM 202 are full. If the character count is 16, microcomputer 200 cannot handle another character so the character that has just been indexed is not displayed or stored and CPU 204 returns to the DMAIN subroutine of FIG. 9. If the character count does not equal 16, the memory and the display can take on another character. The data stored in the display memory in RAM 202 is placed in the next higher memory location and the 8 bit representation of the character that has just been indexed is placed in the lowest order location (see FIG. 8). The character count is incremented and CPU 204 returns to the DMAIN subroutine of FIG. 9.

Figure 12A:
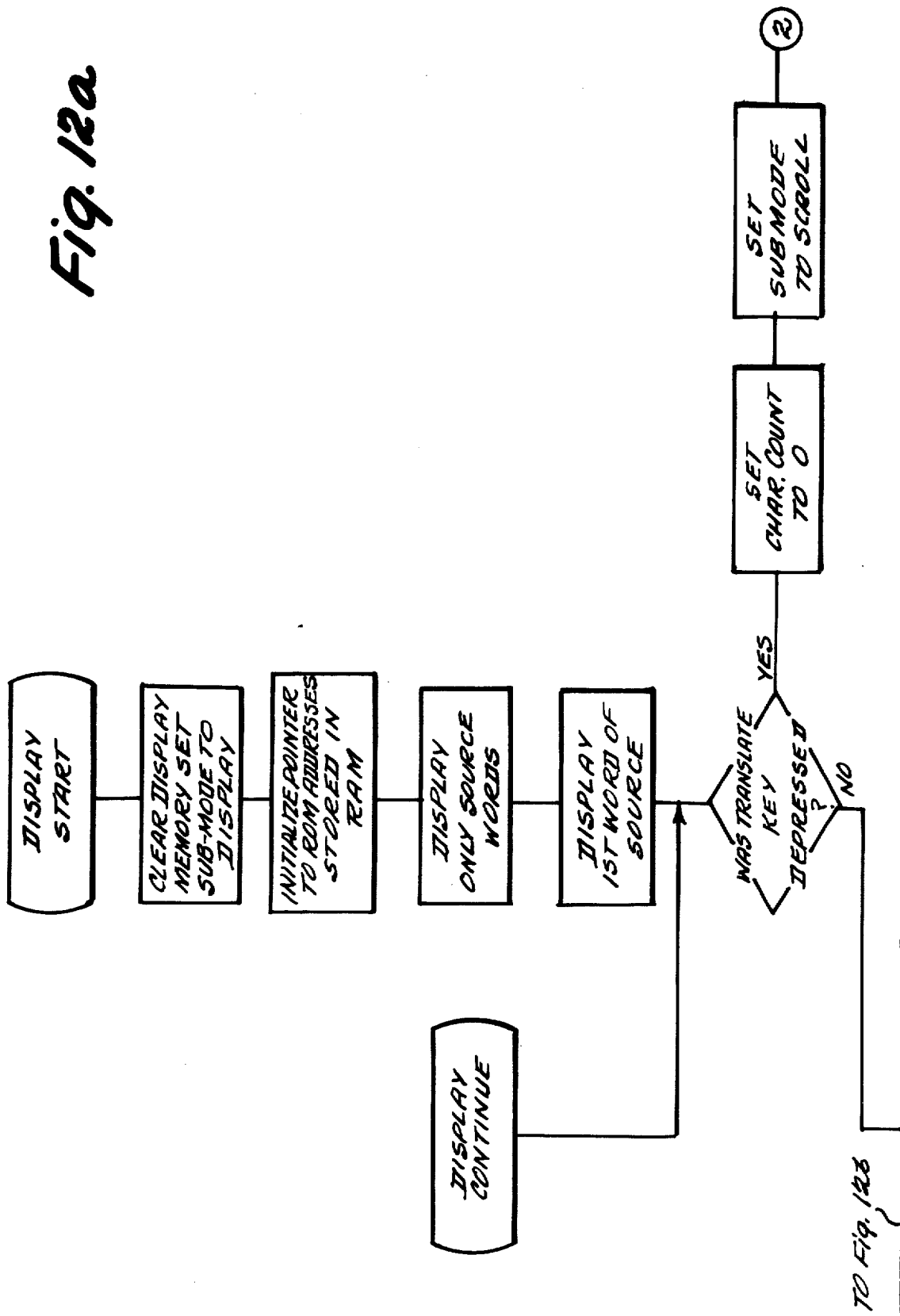
FIGS. 12a,b show a flow diagram of the DISPLAY subroutines.
Figure 12B:
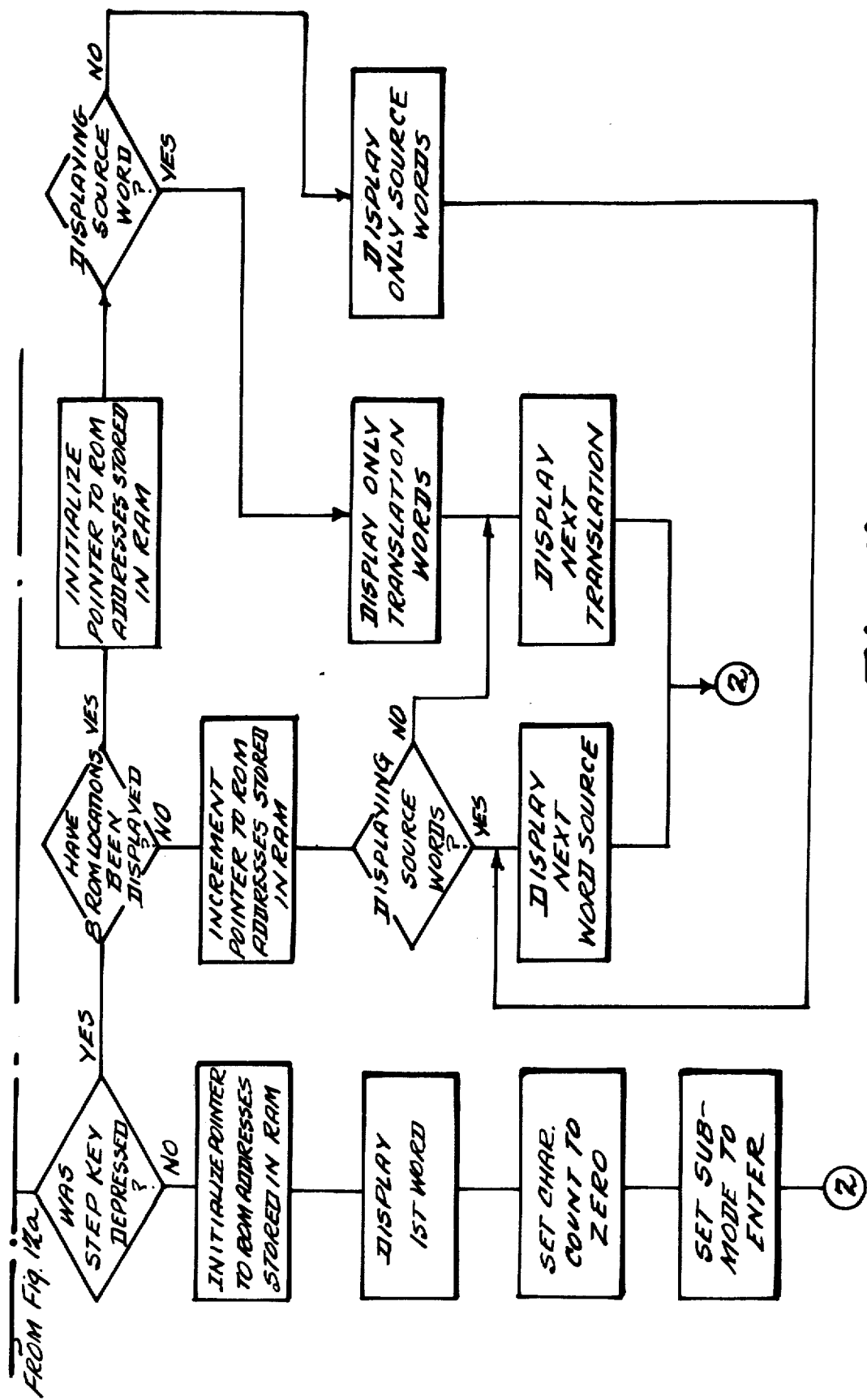

FIG. 12 illustrates the DISPLAY START and the DISPLAY CONTINUE subroutines. These subroutines are entered when the display of the results of the various searches that have occurred is desired. Note that both the indexed word, and the translation or definition of it, are stored in ROM module 300 so that the only information that is stored in RAM 202 is the location in ROM 300 of the source word and its translation or definition.

When the DISPLAY START subroutine is entered, the display memory in RAM 202 is cleared. As discussed above, each byte stored in ROM module 300 begins with a 2 bit word mark so that a word in the first sequence of a pair can be distinguished from a word in the second sequence of the pair. CPU 204 then enters a character in a particular address of RAM 202 to indicate that only the source words are to be displayed first. The first source word is displayed, and CPU 204 enters the DISPLAY CONTINUE subroutine.

CPU 204 then determines whether translate key 494 has been depressed. If it has, the character count is set to 0, the SCROll sub-mode is entered and CPU 204 returns to the DMAIN subroutine of FIG. 9.

If translate key 494 has not been depressed, CPU 204 determines whether step key 496 has been pressed. If step key 496 has been depressed, CPU 204 determines the number of source words or translations that have been displayed. If CPU 204 determines that not all the source or translation words have been displayed, CPU 204 commands that the next source word or the next word of the translation be displayed. CPU 204 then returns to the DMAIN subroutine of FIG. 9 to await the next indexed key. If CPU 204 determines that all the source words or all the translations have been displayed, CPU 204 initializes the pointer in RAM 202 that indicates the RAM register containing the next ROM address to be accessed, and determines whether source words or translations are being displayed. CPU 204 then commands that the other class of words be displayed, i.e., if source words had been previously displayed, CPU 204 will indicate that translations are to be displayed, and if translations had been displayed, CPU 204 will indicate that source words are to be displayed. CPU 204 then displays the first word of either the source or the translation as indicated. CPU 204 returns to the DMAIN subroutine of FIG. 9 to wait for the next key to be depressed.

If step key 496 was not depressed, the pointer to the RAM 202 register storing the next ROM address to be accessed is set to the first RAM register and the first word from the accessed ROM location is displayed. The character count is set to zero, the ENTER sub-mode is entered, and CPU 204 returns to the DMAIN subroutine in FIG. 9.

Figure 13:
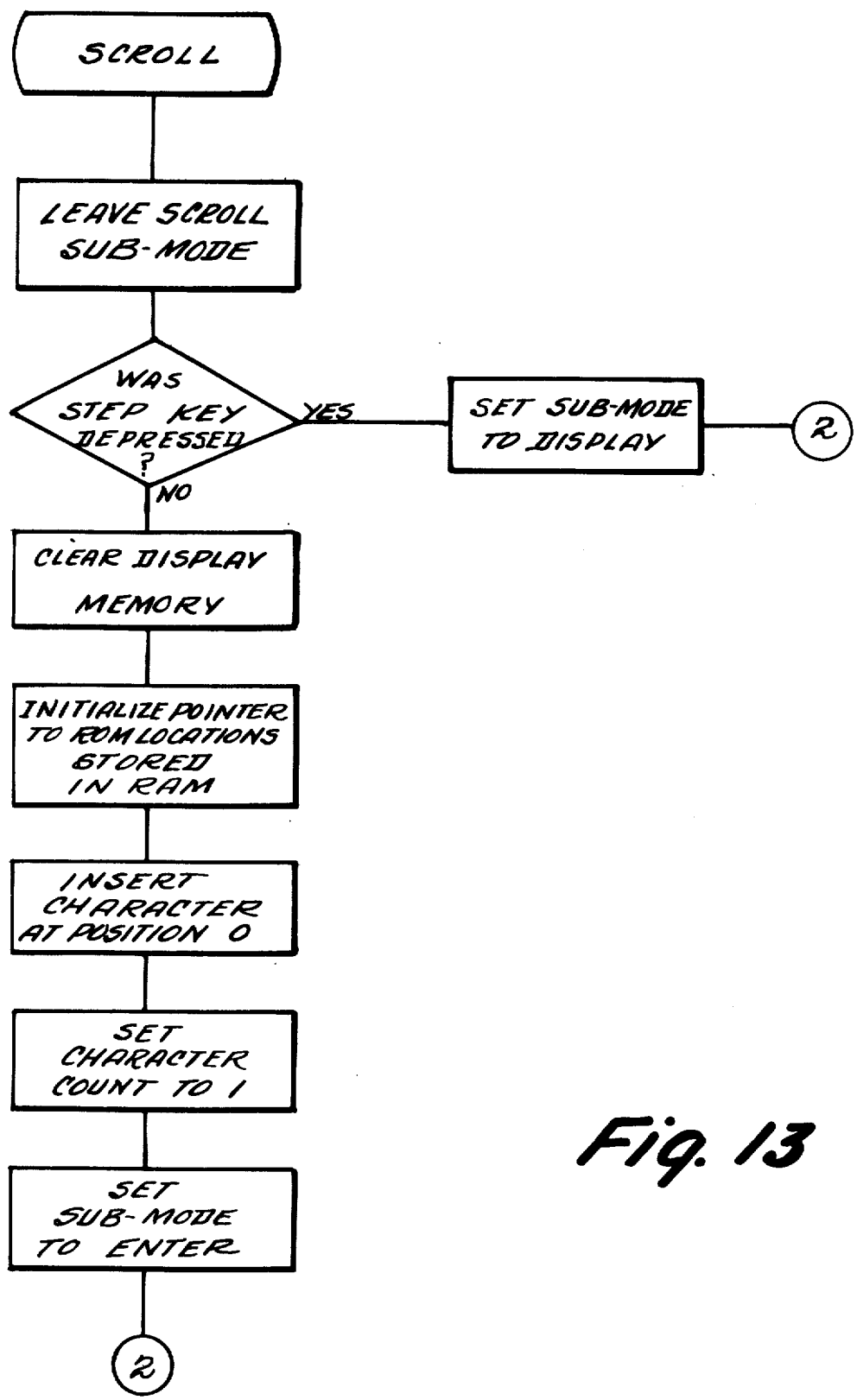
FIG. 13 shows a flow diagram of the SCROLL subroutine.

FIG. 13 represents the SCROLL subroutine which is entered when a key is indexed while the unit is in the SCROLL sub-mode. As discussed above, a key depressed during the SCROLL sub-mode causes the device to enter either the DISPLAY sub-mode or the ENTER sub-mode, depending upon the key depressed. The first step CPU 204 takes is to leave the SCROLL sub-mode. CPU 204 then determines whether step key 496 was depressed. If it was, the CPU enters the DISPLAY sub-mode and returns to the DMAIN subroutine of FIG. 9. If step key 496 was not depressed, display 470 and the display memory in RAM 202 are cleared, the pointer to the RAM 202 register containing the next ROM 300 address to be accessed is initialized, the character that has been indexed is placed in the first position of the display and the display memory, the character count is set to 1, and the ENTER sub-mode is entered. CPU 204 then returns to the DMAIN subroutine of FIG. 9.

Figure 14A:
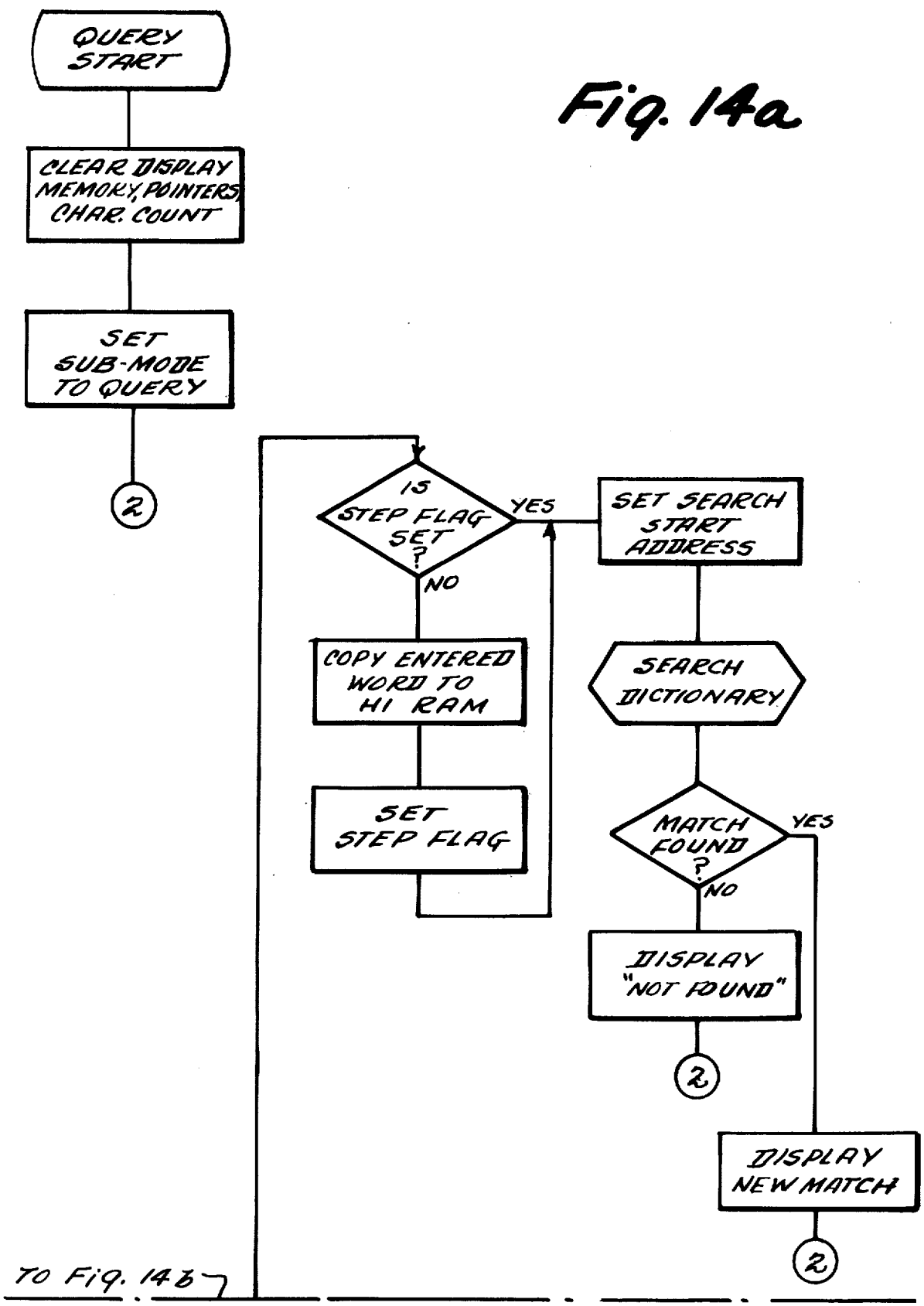
FIGS. 14a,b show a flow diagram of the QUERY subroutines.
Figure 14B:
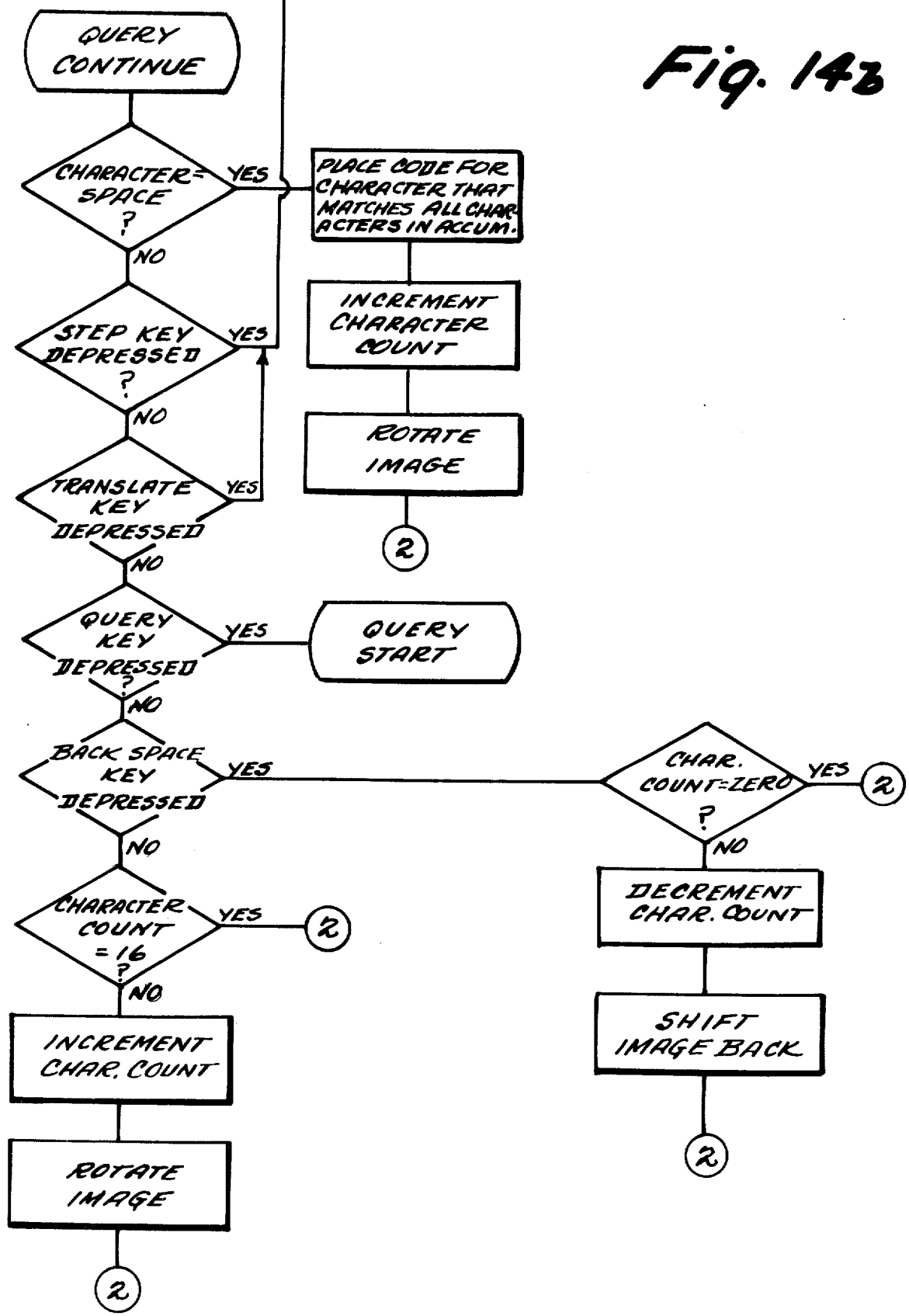

FIG. 14 contains the QUERY START and the QUERY CONTINUE subroutines. When the QUERY START subroutine is entered, the display memory pointers, and the character count are cleared. CPU 204 then sets the sub-mode to QUERY and returns to the DMAIN subroutine of FIG. 9. When the QUERY CONTINUE subroutine is entered, CPU 204 first determines whether the character indexed was space key 492. If it was, the character count is incremented, the data stored in the display memory of RAM 202 placed in the next highest location, and an 8 bit representation of a character that is assumed to match any character stored in ROM module 300 placed in the lowest order location of the display memory. CPU 204 then returns to the DMAIN subroutine of FIG. 9.

If space key 492 was not depressed, CPU 204 then determines whether step key 496 was depressed. If it was, CPU 204 first determines whether step key 490 has been depressed previously while in the current QUERY sub-mode. If it was not, the characters stored in the display memory of RAM 202 are shifted to a different memory area of RAM 202. A flag is then set in a memory location in the RAM 202 that indicates that step key 496 has been pressed while in the current QUERY sub-mode. The steps continue as if the step key were previously depressed while the current QUERY sub-mode. The address of the location in ROM module 300 where the search for the word will begin is entered in a memory location in the RAM of microcomputer 200. The search is then conducted as controlled by the SEARCH subroutine, and if a match for the entered letters is found, the new match is displayed. CPU 204 then returns to the DMAIN subroutine of FIG. 9. If a match is not found, the words "NOT FOUND" are displayed and CPU 204 returns to the DMAIN subroutine of FIG. 9.

If CPU 204 determines that step key 496 was not depressed, CPU 204 then determines whether translate key 494 has been depressed. If it has, the same steps are followed as if the step key has been depressed as discussed above. If the translate key has not been depressed, CPU 204 then determines whether query key 488 has been depressed. If it has, the QUERY START subroutine is entered from the top.

If query key 488 has not been depressed, CPU 204 determines whether backspace key 490 has been depressed. If it has, CPU 204 checks whether the character count is zero. If the character count is not zero, the character count is decremented by one, the data stored in the display memory of RAM 202 is shifted to the next lower location, losing the data in the lowest location, and CPU 204 returns to the DMAIN subroutine of FIG. 9. If the character count is zero, CPU 204 simply returns to the DMAIN subroutine of FIG. 9.

If backspace key 490 was not depressed, one of the alphabetic keys A–Z must have been depressed. CPU 204 then determines whether the character count is 16. If it is, the display and the display memory cannot accommodate another character so CPU 204 does not display or store the character represented by the key just pressed, and returns to the DMAIN subroutine of FIG. 9. If the character count is not 16, the character count is incremented by 1, the data stored in the display memory is advanced to the next highest location, the 8 bit character representing the new key that has been depressed is entered in the lowest order location of memory and the new character is displayed on display 470. CPU 204 then returns to the DMAIN subroutine of FIG. 9.

Figure 15:
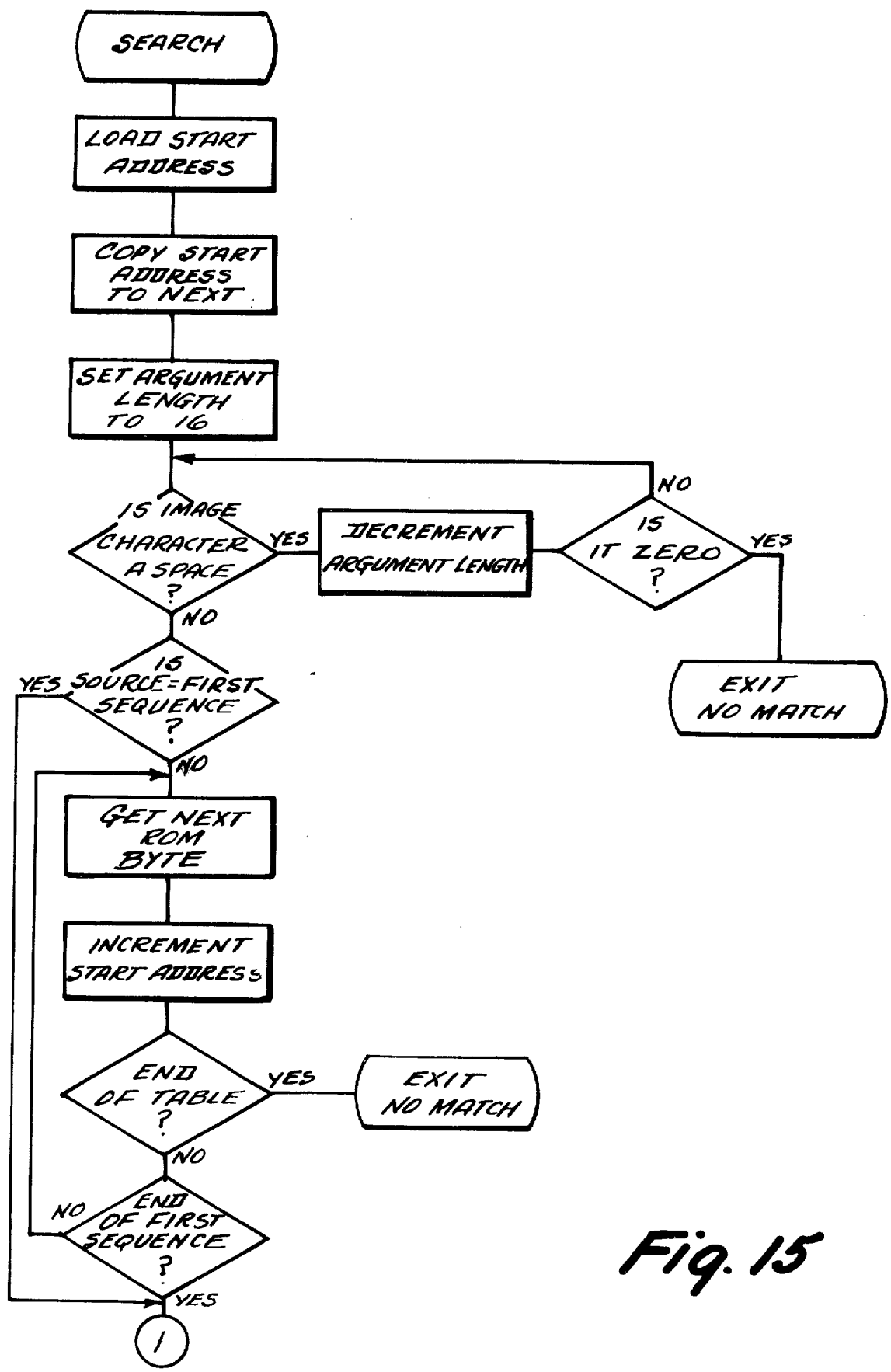
FIGS. 15 and 16a,b show a flow diagram of the SEARCH subroutine.
Figure 16A:
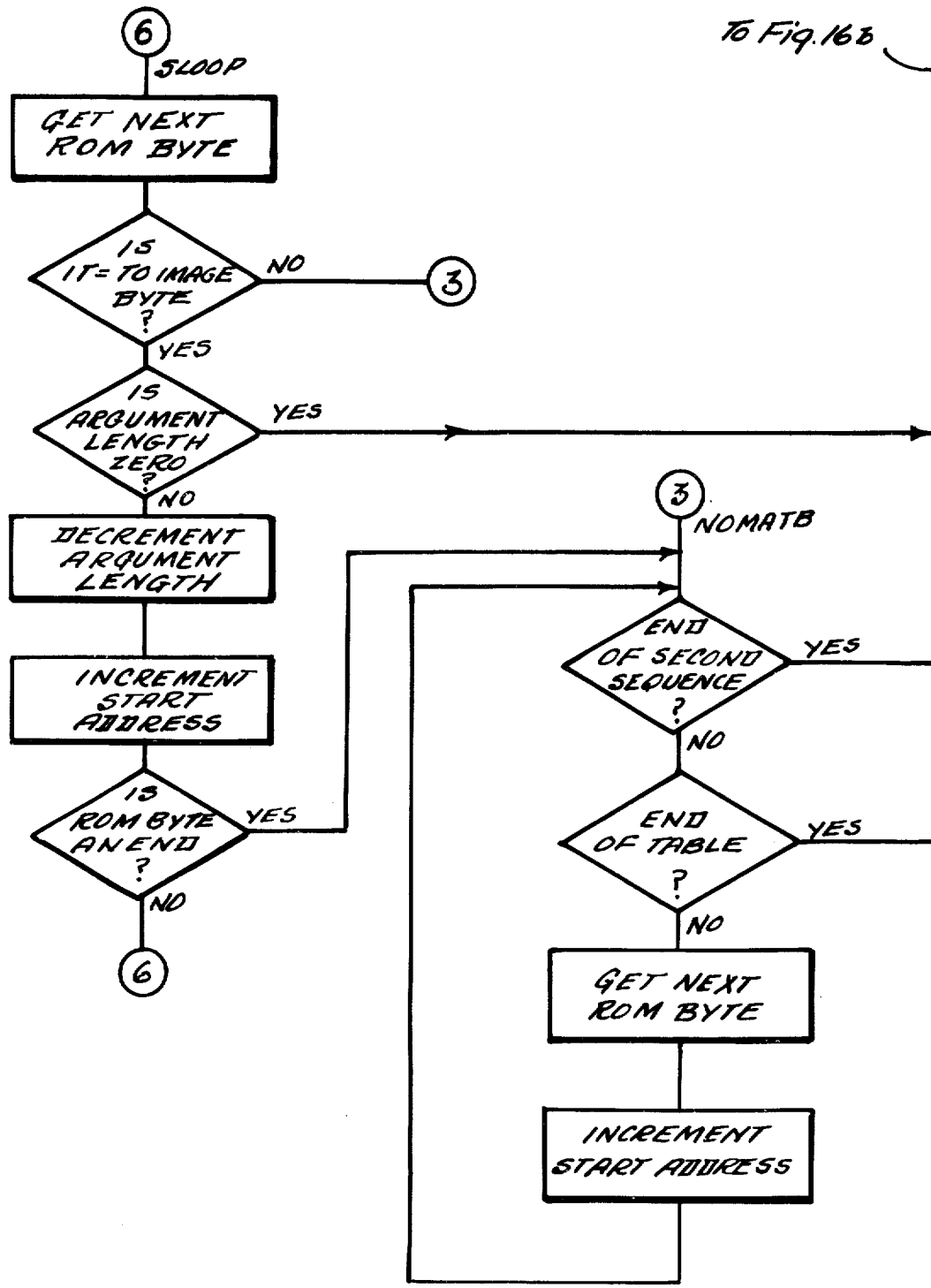
Figure 16B:
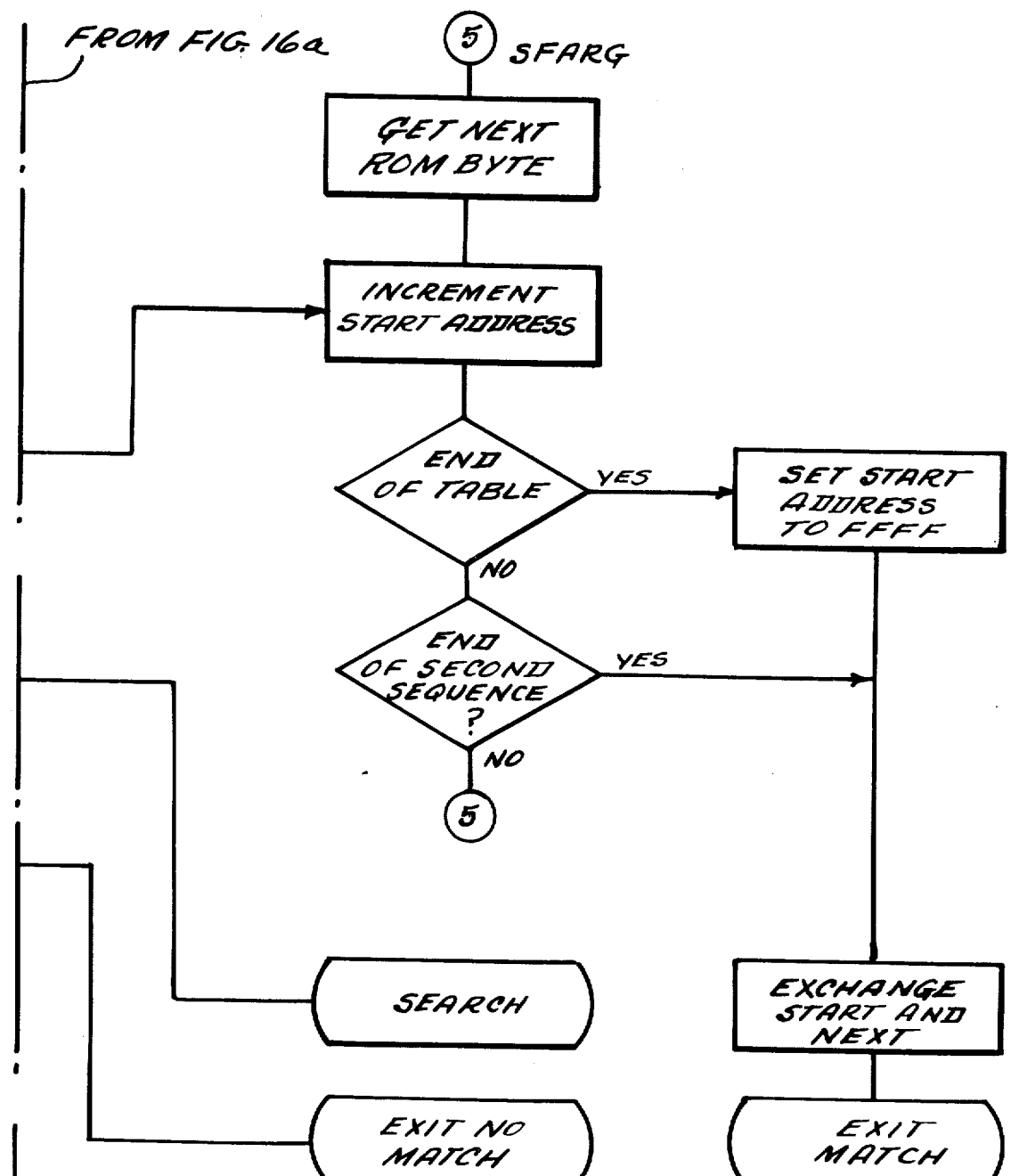

FIGS. 15 and 16 represent the SEARCH subroutine. Two registers in RAM 202 are used to store pertinent ROM 300 addresses. At the end of the search routine, the Start Address register indicates the ROM address of the beginning of the found word (the contents of which are transferred to the ROM Module Address storage area of RAM 302 in FIG. 8). The Next Address register indicates the ROM address of the beginning of the source word after the word that has been found (so that, in the QUERY mode, the search for the next matching word will not duplicate the portion of ROM 300 already searched). Initially, both the Start and Next Addresses are loaded to the address where the search will begin.

Generally, the search is conducted by comparing the first character of the word to be searched for with the first character of an appropriate word in ROM 300 until a match is found. Next, the second characters of each are compared. If they match, the third characters of each are compared. If they do not match, the first character of the next appropriate word in ROM 300 is compared with the first character of the word being searched for. The process continues until a perfect match is found, or the entire table is searched.

A register in RAM 202 called Argument Length stores the position of the character of the word being searched for that is being or will next be compared (called the image character). This register is initially set to 16, the maximum length that an entered word may be. Removal of the spaces from the left portion of the image field (corresponding to a higher number Argument Length) is first performed. CPU 204 determines if the image character is a space. If it is, the Argument Length register is decremented. If the Argument Length register is now zero, CPU 204 returns to the place from which the SEARCH subroutine was called without a match, since all the image characters were spaces. If the register is not zero, CPU 204 determines if the presently indicated image character is a space, and so on.

If the image character is not a space, CPU 204 determines the order of translation. Either the first of the pair of ROM 300 sequences can be searched (the source) with the second sequence displayed as the desired translation (the translation), or the second sequence of the ROM 300 entry can be searched (the source) with the first sequence displayed as the desired translation (the translation). If the first sequence is the source, CPU 204 executed the SLOOP subroutine of FIG. 16, since the Start Address is pointing to the first character of the source word. If the second sequence in the source, the first location of the character of the source must be entered in the Start Address. The ROM 300 byte pointed to by the Start Address is retrieved, and the Start Address is incremented. CPU 204 determines whether this byte is the end of the ROM table. If it is, CPU 204 returns to the place from which the SEARCH subroutine was called with no match, since the second sequence of the ROM data was never found in the table.

If the byte is not the end of the table, CPU 204 determines whether the byte is the end of the first sequence. If it is, the CPU enters the SLOOP subroutine of FIG. 16. If it is not, the CPU retrieves the next ROM byte as indicated by the Start Address, and proceeds as above.

Referring now to FIG. 16, when CPU 204 enters the SLOOP subroutine, the Start Address indicates the location of the first character of the appropriate word in ROM 300 to be searched. This character is retrieved from ROM 300 and compared to the image byte. If they do not match, CPU 204 enters the NOMATB subroutine described below.

If the two bytes do match, CPU 204 determines if the Argument Length is zero, indicating all the characters matched and, therefore, a matching word has been found.

If the Argument Length is zero, CPU 204 then searches for the beginning of the next first sequence of ROM 300 so the search for the next match will continue from where it left off, if the device is in the QUERY sub-mode. The Start Address is incremented. CPU 204 then determines if the ROM byte is the end of the table. If it is not, CPU 204 determines if the ROM byte is the end of the second sequence. If it is not, CPU 204 jumps to the SFARG subroutine and the ROM 300 byte indicated by the Start Address is retrieved. If the byte does represent the end of the table, the Start Address is set to the highest possible number (FFFF in hexadecimal) to indicate for the QUERY sub-mode that the last match has been found. If the byte is the end of the second sequence, which is what is eventually desired, CPU 204 continues as if the byte were the end of the table. The data in the Start Address, which currently holds the address of the beginning of the first sequence of the ROM 300 pair after the matched word, and the data in the Next Address, which currently holds the address of the location of the beginning of the first sequence of the matched word, are then exchanged and CPU 204 returns to the point from which the SEARCH subroutine was called with a match.

If the Argument Length is not zero, more comparisons must be made to determine if the words match. The Argument Length is decremented, the Start Address is incremented, and CPU 204 determines if the previously retrieved ROM byte is the end of either a first or second sequence. If it is an end, the ROM word is shorter than the entered word, so there is no match and CPU 204 enters the NOMATB subroutine. If the ROM byte is not an end, CPU 204 re-enters the SLOOP subroutine and the ROM byte indicated by the Start Address is retrieved for comparison.

The NOMATB subroutine is entered when no match has been found in order to place the location of the beginning of first sequence of the next ROM 300 pair in the Start Address. The most recent ROM byte to be retrieved is examined to determine if it is the end of the second sequence. If it is, the Start Address contains the location of the beginning of the first sequence of the next pair in ROM 300, and CPU 204 returns to the SEARCH subroutine of FIG. 15 to begin the process for the next ROM word.

If the most recently retrieved byte is not the end of the second sequence, CPU 204 determines if the byte is the end of the table. If it is, the search is ended, and CPU 204 returns to the point from which the SEARCH subroutine was entered with no match. If the byte is not the end of the table, the location in Start Address is accessed and the Start Address is then incremented. CPU 204 then returns to the NOMATB subroutine.

Referring to FIG. 5a, the circuitry, keyboard and display are mounted on or in a housing which may be of any suitable material, e.g., a hard plastic. The unique apparatus of this invention finds particular utility as a hand-held unit. For example, the unit can be 6"×3"×1¼" thick.

The basic unit can, if desired, be built into or temporarily coupled with a portable desk unit which can contain a magnetic tape cartridge drive and/or a small thermoprinter and/or an acoustic coupler. With a system of this type, up to 500,000 characters of storage could be used to allow for storage of large dictionaries, phone directories, sections of legal or medical information and books of facts. A print capability would then allow for hard copy recording of retrieved information. Telephone interface capability would permit sending and receiving of stored information to and from a remotely located computer.

The unit is preferably powered by rechargeable batteries and may include, as an accessory, a compact battery charge unit capable of fully recharging the unit within 16 hours.

IV. DETAILED PROGRAM LISTINGS

The following lists all of the specific steps for carrying out the functions described above using the instructions in the above-mentioned *MCS-48 Microcomputer User's Manual*. The calculator steps are conventional and not listed.

ISIS-II S046 ASSEMBLER, V1.2

```
LOC  OBJ       SEQ         SOURCE STATEMENT 0000             0          ORG    0
0000 23F4        1 START:   MOV    A,#244   ;LOAD TIMER WITH 1 MILLISECOND
0002 62          2          MOV    T,A
0003 27          3          CLR    A
0004 D7          4          MOV    PSW,A    ;SET TOP OF STACK
0005 0460        5          JMP    SSTART
                 6 ;
                 7 ;        THIS IS THE INTERRUPT SERVICE ROUTINE
                 8 ;
                 9 ;
0007 D5         10 INTER:   SEL    RB1      ;SELECT BANK #1
0008 AA         11          MOV    R2,A     ;SAVE ACCUMULATOR
0009 B817       12          MOV    R0,#23
000B 10         13          INC    @R0      ;BUMP THE 4HZ TIKKER
000C 1E         14          INC    R6       ;INCREMENT POSITION
000D 230F       15          MOV    A,#15    ;WRAP AROUND MASK
000F 5E         16          ANL    A,R6     ;MODULO 16
0010 AE         17          MOV    R6,A     ;PUT IT BACK
0011 23F4       18          MOV    A,#244   ;REARM TIMER
0013 62         19          MOV    T,A
                20 ;
0014 FE         21          MOV    A,R6     ;GET POSITION
0015 0320       22          ADD    A,#32    ;ADD BASE OF IMAGE
0017 A8         23          MOV    R0,A     ;INDIRECT ADDRESS
0018 F0         24          MOV    A,@R0    ;GET NEXT CHARACTER
0019 60         25          ADD    A,@R0    ;DOUBLE IT
001A 0380       26          ADD    A,#80H   ;ADD DSTBL - ACTUALLY THIS IS THE
                27                          ;PORTION OF THE ADDRESS WHICH IS
                28                          ;LEFT AFTER THE PAGE 3 PART HAS
                29                          ;BEEN ASSUMED
001C A8         30          MOV    R0,A     ;SAVE IT
001D E3         31          MOVP3  A,@A     ;GET BYTE 1
001E 39         32          OUTL   P1,A     ;OUTPUT TO PORT 1
001F F8         33          MOV    A,R0
0020 17         34          INC    A
0021 E3         35          MOVP3  A,@A     ;GET BYTE 2
0022 3A         36          OUTL   P2,A     ;OUTPUT TO PORT 2
0023 FE         37          MOV    A,R6     ;GET POSITION
0024 37         38          CPL    A
0025 530F       39          ANL    A,#0FH   ;DISPLAY IS BACKWARDS
0027 90         40          MOVX   @R0,A    ;OUTPUT POSITION TO BUS
                41 ;
0028 FD         42          MOV    A,R5     ;GET KEYBOARD STATE
                43                          ;00 => INACTIVE
                44                          ;01 => RELEASE
0029 9633       45          JNZ    ACTIV
002B 264A       46          JNT0   KEY1     ;IF T0 IS TRUE
002D 464D       47          JNT1   KEY2     ;IF T1 IS TRUE
002F FA         48 RESTO:   MOV    A,R2     ;RESTORE ACCUMULATOR
0030 C5         49          SEL    RB0      ;SELECT BANK #0
0031 25         50          EN     TCNTI    ;REENABLE INTERRUPTS FROM TIMER
0032 93         51          RETR            ;RESTORE AND RETURN
                52
                53 ;NON-ZERO MEANS STATE IS RELEASE
                54 $TITLE('KEYBOARD RELEASE STATE')
```

ISIS-II 8048 ASSEMBLER, V1.2
KEYBOARD RELEASE STATE

```
LOC   OBJ      SEQ              SOURCE STATEMENT

0033  FF        55 ACTIV:  MOV    A,R7      ;GET ACTIVE KEY
0034  77        56         RR     A
0035  530F      57         ANL    A,#15     ;ISOLATE ROW NUMBER
0037  37        58         CPL    A         ;1'S COMP
0038  17        59         INC    A         ;2'S
0039  6E        60         ADD    A,R6
003A  962F      61         JNZ    RESTR     ;NO MATCH => DO NOT WORRY
003C  FF        62         MOV    A,R7      ;GET ACTIVE KEY
003D  67        63         RRC    A         ;GET LS BIT INTO CARRY
003E  E646      64         JNC    REVEN     ;CARRY MEANS ODD
0040  462F      65         JNT1   RESTR
0042  BD00      66 RINAC:  MOV    R5,#0     ;SET STATE TO INACTIVE
0044  042F      67         JMP    RESTR
                68 ;
0046  262F      69 REVEN:  JNT0   RESTR     ;IF KEY PRESENT, IT MUST STILL BE CLOSED
0048  0442      70         JMP    RINAC
                71 ;
                72 $TITLE ('KEYBOARD STATE MAKE')
```

ISIS-II 8048 ASSEMBLER, V1.2
KEYBOARD STATE MAKE

```
LOC   OBJ      SEQ              SOURCE STATEMENT 004A  27        73 KEY1:   CLR    A         ;SET ACTIVE KEY TO ZERO
004B  044F      74         JMP    KEYIN
004D  2301      75 KEY2:   MOV    A,#1      ;SET ACTIVE KEY TO 1
004F  6E        76 KEYIN:  ADD    A,R6      ;ADD POSITION
0050  6E        77         ADD    A,R6      ;TWICE
0051  AF        78         MOV    R7,A      ;PUT VALUE IN ACTIVE KEY
0052  1D        79         INC    R5        ;SET STATE TO RELEASE(MAKE+1)
0053  C5        80         SEL    RB0
0054  D31E      81         XRL    A,#1EH    ;********************************
0056  6B        82         ADD    A,R3      ;ADD MODE
0057  D5        83         SEL    RB1
0058  03E0      84         ADD    A,#0E0H   ;BASE OF KEYBOARD TABLE IN PAGE 3
005A  E3        85         MOVP3  A,@A      ;TRANSLATE KEY INTO CHARACTER #
005B  B802      86         MOV    R0,#2
005D  A0        87         MOV    @R0,A     ;PUT THIS CHAR IN LAST-KEY
005E  042F      88         JMP    RESTR
                89 ;
                90 ;
                91 ;        END OF INTERRUPT SERVICE
                92 ;
                93 ;
                94 ;
                95 ;
                96 ;
                97 ;        INITIALIZER
                98 ;
                99 ;
0060  C5       100 SSTART: SEL    RB0       ;SELECT REGISTER BANK ZERO
0061  B902     101         MOV    R1,#2     ;BASE OF RAM
0063  B83E     102         MOV    R0,#62    ;LOCATIONS TO CLEAR
```

ISIS-II 8048 ASSEMBLER, V1.2
KEYBOARD STATE MAKE -continued

| LOC | OBJ | SEQ | | SOURCE STATEMENT | | |
|---|---|---|---|---|---|---|
| 0065 | A1 | 103 | CLOOP: | MOV | @R1,A | ;CLEAR NEXT LOCATION |
| 0066 | 19 | 104 | | INC | R1 | |
| 0067 | E865 | 105 | | DJNZ | R0,CLOOP | ;LOOP CONTROL |
| 0069 | 55 | 106 | | STRT | T | ;START THE TIMER |
| 006A | 25 | 107 | | EN | TCNTI | ;ENABLE THE INTERRUPTS FROM THE TIMER |
| 006B | 240E | 108 | | JMP | DICTON | |
| | | 109 | ; | | | |
| | | 110 | ; | | | |
| | | 111 | ;ROTATE WILL SHIFT THE CONTENTS OF THE REFRESH TABLE LEFT | | | |
| | | 112 | ;ONE POSITION | | | |
| | | 113 | ;AND INSERT THE CONTENTS OF THE ACCUMULATOR IN THE RIGHT- | | | |
| | | 114 | ;MOST PLACE. | | | |
| | | 115 | ;THE ACCUMULATOR WILL CONTAIN THE FORMER MS BYTE. | | | |
| | | 116 | ; | | | |
| 006D | 533F | 117 | ROTATE: | ANL | A,#63 | ;MASK OFF UNDESIREABLE BITS |
| 006F | BC10 | 118 | | MOV | R4,#16 | ;LOOP CONTROL |
| 0071 | B820 | 119 | | MOV | R0,#32 | ;BASE OF DISPLAY IMAGE |
| 0073 | 20 | 120 | ROLOOP: | XCH | A,@R0 | ;SWITCH |
| 0074 | 18 | 121 | | INC | R0 | |
| 0075 | EC73 | 122 | | DJNZ | R4,ROLOOP | ;CONTROL THE LOOP |
| 0077 | 83 | 123 | | RET | | |
| | | 124 | ; | | | |
| | | 125 | $TITLE ('DISPLAY SUBMODE') | | | |

ISIS-II 8048 ASSEMBLER, V1.2
DISPLAY SUBMODE

| LOC | OBJ | SEQ | | SOURCE STATEMENT | | |
|---|---|---|---|---|---|---|
| 0078 | 14EA | 126 | DSTART: | CALL | CLIMAG | ;CLEAR IMAGE |
| 007A | B816 | 127 | | MOV | R0,#22 | |
| 007C | B002 | 128 | | MOV | @R0,#2 | ;SET SUBMODE TO DISPLAY |
| 007E | 27 | 129 | | CLR | A | ;CLEAR WORD INDEX |
| 007F | AF | 130 | | MOV | R7,A | |
| 0080 | C8 | 131 | | DEC | R0 | ;SET PASS TO SOURCE |
| 0081 | A0 | 132 | | MOV | @R0,A | |
| 0082 | 34F2 | 133 | | CALL | DWORD | |
| 0084 | 14F5 | 134 | | CALL | INCR? | |
| 0086 | 243A | 135 | | JMP | DMAIN | |
| 0088 | 23F1 | 136 | DISPLY: | MOV | A,#241 | ;IS CHAR = TRANSLATE? |
| 008A | 6D | 137 | | ADD | A,R5 | |
| 008B | C6A0 | 138 | | JZ | DSLEW | |
| 008D | 23D4 | 139 | | MOV | A,#212 | ;IS CHAR = STEP? |
| 008F | 6D | 140 | | ADD | A,R5 | |
| 0090 | C6AA | 141 | | JZ | DSTEP | |
| 0092 | BF00 | 142 | | MOV | R7,#0 | ;SET WORD INDEX TO ZERO |
| 0094 | 14EA | 143 | | CALL | CLIMAG | ;CLEAR IMAGE |
| 0096 | 34F2 | 144 | | CALL | DWORD | ;DISPLAY 1ST WORD |
| 0098 | BE00 | 145 | | MOV | R6,#0 | ;CLEAR CHAR COUNT |
| 009A | B816 | 146 | | MOV | R0,#22 | ;SET SUBMODE TO ENTER |
| 009C | B001 | 147 | | MOV | @R0,#1 | |
| 009E | 243A | 148 | | JMP | DMAIN | |
| | | 149 | ; | | | |
| 00A0 | B814 | 150 | DSLEW: | MOV | R0,#20 | |

ISIS-II 8048 ASSEMBLER, V1.2
DISPLAY SUBMODE -continued

| LOC  OBJ   | SEQ         | SOURCE STATEMENT |         |                      |
|------------|-------------|-------|---------|----------------------|
| 00A2 B006  | 151         | MOV   | @R0,#6  | ;SET SCROLL FLAG     |
| 00A4 B816  | 152         | MOV   | R0,#22  |                      |
| 00A6 B004  | 153         | MOV   | @R0,#4  | ;SET SUBMODE TO SCROLL |
| 00A8 243A  | 154         | JMP   | DMAIN   |                      |
|            | 155 ;       |       |         |                      |
| 00AA 34F2  | 156 DSTEP:  | CALL  | DWORD   |                      |
| 00AC 14F5  | 157         | CALL  | INCR7   |                      |
| 00AE 243A  | 158         | JMP   | DMAIN   |                      |
|            | 159 $TITLE ('SCROLL SUBMODE') |  |  |        |

ISIS-II 8048 ASSEMBLER, V1.2
SCROLL SUBMODE

| LOC  OBJ   | SEQ          | SOURCE STATEMENT |       |                    |
|------------|--------------|-------|---------|----------------------|
| 00B0 B814  | 160 SCROLL:  | MOV   | R0,#20  |                      |
| 00B2 B000  | 161          | MOV   | @R0,#0  | ;RESET SCROLL FLAG   |
| 00B4 23D4  | 162          | MOV   | A,#212  |                      |
| 00B6 6D    | 163          | ADD   | A,R5    | ;IS CHAR = STEP?     |
| 00B7 C678  | 164          | JZ    | DSTART  |                      |
| 00B9 27    | 165          | CLR   | A       |                      |
| 00BA AE    | 166          | MOV   | R6,A    | ;CLEAR CHAR COUNT    |
| 00BB AF    | 167          | MOV   | R7,A    | ;CLEAR WORD POINTER  |
| 00BC B816  | 168          | MOV   | R0,#22  |                      |
| 00BE B001  | 169          | MOV   | @R0,#1  | ;SET SUBMODE TO ENTER |
| 00C0 2475  | 170          | JMP   | ENTER   |                      |
|            | 171 $ TITLE ('SUBROUTINES') |  |    |                  |

ISIS-II 8048 ASSEMBLER, V1.2
SUBROUTINES

| LOC  OBJ   | SEQ          | SOURCE STATEMENT |       |                    |
|------------|--------------|-------|---------|----------------------|
|            | 172 ;        |       |         |                      |
|            | 173 ;        | SUBROUTINES |   |                      |
|            | 174 ;        |       |         |                      |
|            | 175 ;        |       |         |                      |
|            | 176 ;SHIFT WILL MOVE 16 BYTES BEGINNING AT A TO POSITIONS 1 LESS |  |  |  |
|            | 177 ;        |       |         |                      |
| 00C2 BC10  | 178 SHIFT:   | MOV   | R4,#16  |                      |
| 00C4 A8    | 179          | MOV   | R0,A    |                      |
| 00C5 232D  | 180          | MOV   | A,#45   | ;A SPACE             |
| 00C7 20    | 181 SHLOOP:  | XCH   | A,@R0   |                      |
| 00C8 C8    | 182          | DEC   | R0      |                      |
| 00C9 ECC7  | 183          | DJNZ  | R4,SHLOOP |                    |
| 00CB 83    | 184          | RET   |         |                      |
|            | 185 ;        |       |         |                      |
|            | 186 ;        |       |         |                      |
|            | 187 ;DISCAP WILL DISPLAY 10 BYTES FROM PAGE 3 AT A |  |  |  |
|            | 188 ;        |       |         |                      |
| 00CC AC    | 189 DISCAP:  | MOV   | R4,A    | ;SOURCE ADDRESS      |
| 00CD 14EA  | 190          | CALL  | CLIMAG  |                      |
| 00CF B90A  | 191          | MOV   | R1,#10  | ;LOOP CONTROL        |

ISIS-II 8048 ASSEMBLER, V1.2
SUBROUTINES -continued

```
LOC   OBJ        SEQ           SOURCE STATEMENT

0001  B82F       192           MOV     R0,#47      ;LEFT OF IMAGE
0003  FC         193 DCLOOP:   MOV     A,R4
0004  1C         194           INC     R4
0005  E3         195           MOVP3   A,@A        ;GET NEXT BYTE OF CAPTION
0006  A0         196           MOV     @R0,A       ;DISPLAY IT
0007  C8         197           DEC     R0
0008  E903       198           DJNZ    R1,DCLOOP
000A  83         199 RETURN:   RET
                 200 ;
                 201 ;
                 202 ;GETKEY WILL PLACE 63(EMPTY) IN THE ACCUMULATOR AND EXCHANGE THAT WITH LAST-
                 203 ;KEY. IT WILL THEN COMPARE A WITH 63. A WILL BE ZERO IF NO KEY CAME IN.
                 204 ;THE CONTENTS OF A ARE SAVED IN R5.
                 205 ;
000B  233F       206 GETKEY:   MOV     A,#63
000D  2A         207           XCH     A,R2
000E  AD         208           MOV     R5,A
000F  03C1       209           ADD     A,#193
00E1  83         210           RET
                 211 ;
                 212 ;
                 213 ;SSETUP WILL SET LOCATIONS 18,19 TO 16, THE START OF THE TRANSLATION TABLE
                 214 ;
00E2  B912       215 SSETUP:   MOV     R1,#18
00E4  B110       216           MOV     @R1,#16
00E6  19         217           INC     R1
00E7  B100       218           MOV     @R1,#0
00E9  83         219           RET
                 220 ;
                 221 ;
                 222 ;CLIMAG WILL SET THE IMAGE TO A SPACES (#45).
                 223 ;
00EA  232D       224 CLIMAG:   MOV     A,#45
00EC  B820       225           MOV     R0,#32      ;BASE OF IMAGE
00EE  B910       226           MOV     R1,#16      ;LOOP CONTROL
00F0  A0         227 CLIMLP:   MOV     @R0,A
00F1  18         228           INC     R0
00F2  E9F0       229           DJNZ    R1,CLIMLP
00F4  83         230 RET1:     RET
                 231 ;
                 232 ;
                 233 ;INCR7 WILL INCREMENT THE WORD POINTER (R7) MODULO 8.
                 234 ;PASS FLAG IS COMPLEMENTED IF THE POINTER BECOMES ZERO.
                 235 ;
00F5  1F         236 INCR7:    INC     R7
00F6  FF         237           MOV     A,R7
00F7  72FA       238           JB3     INCR7X
00F9  83         239           RET
00FA  BF00       240 INCR7X:   MOV     R7,#0
00FC  B815       241           MOV     R0,#21
00FE  10         242           INC     @R0
00FF  83         243           RET
                 244 ;
                 245 ;ADIX2P WILL COPY THE CONTENTS IF 18 AND 19 TO THE WORD POINTER
                 246 ;SELECTED BY R7
```

ISIS-II 8048 ASSEMBLER, V1.2
SUBROUTINES -continued

| LOC  | OBJ  | SEQ | SOURCE STATEMENT | | |
|------|------|-----|------|------|------|
|      |      | 247 ; | | | |
| 0100 | FF   | 248 | ADIX2P: MOV | A,R7 | |
| 0101 | 6F   | 249 | ADD | A,R7 | |
| 0102 | 0330 | 250 | ADD | A,#48 | |
| 0104 | A8   | 251 | MOV | R0,A | |
| 0105 | B912 | 252 | MOV | R1,#18 | |
| 0107 | F1   | 253 | MOV | A,@R1 | |
| 0108 | A0   | 254 | MOV | @R0,A | |
| 0109 | 18   | 255 | INC | R0 | |
| 010A | 19   | 256 | INC | R1 | |
| 010B | F1   | 257 | MOV | A,@R1 | |
| 010C | A0   | 258 | MOV | @R0,A | |
| 010D | 83   | 259 | RET | | |
|      |      | 260 ; | | | |
|      |      | 261 $TITLE ('DICTIONARY MAIN LOOP') | | | |

ISIS-II 8048 ASSEMBLER, V1.2
DICTIONARY MAIN LOOP

| LOC  | OBJ  | SEQ | SOURCE STATEMENT | | |
|------|------|-----|------|------|------|
| 010E | A5   | 262 | DICTON: CLR | F1 | |
| 010F | B816 | 263 | MOV | R0,#22 | |
| 0111 | B001 | 264 | MOV | @R0,#1 | ;SET MODE TO ENTER |
| 0113 | 27   | 265 | CLR | A | |
| 0114 | AE   | 266 | MOV | R6,A | ;CLEAR COUNT |
| 0115 | AF   | 267 | MOV | R7,A | ;CLEAR WORD POINTER |
| 0116 | B812 | 268 | MOV | R0,#18 | |
| 0118 | A0   | 269 | MOV | @R0,A | |
| 0119 | 18   | 270 | INC | R0 | |
| 011A | A0   | 271 | MOV | @R0,A | ;POINT TO TITLE OF THIS DICTIONARY |
| 011B | BA10 | 272 | MOV | R2,#16 | ;THE LENGTH OF ALL TITLES |
| 011D | 5494 | 273 | CAPLUP: CALL | RROM | |
| 011F | 146D | 274 | CALL | ROTATE | |
| 0121 | EA1D | 275 | DJNZ | R2,CAPLUP | |
| 0123 | 85   | 276 | CLR | F0 | ;SET DIRECTION FORWARD (I.E. SOURCE = ENGLISH) |
| 0124 | B810 | 277 | MOV | R0,#16 | |
| 0126 | B930 | 278 | MOV | R1,#48 | |
| 0128 | A1   | 279 | DCLEAR: MOV | @R1,A | ;CLEAR WORD POINTERS |
| 0129 | 19   | 280 | INC | R1 | |
| 012A | E828 | 281 | DJNZ | R0,DCLEAR | |
| 012C | BA3F | 282 | MOV | R2,#63 | ;SET KEYBOARD BUFFER TO EMPTY |
| 012E | 14D8 | 283 | DCWAIT: CALL | GETKEY | ;ACCEPT DIRECTION |
| 0130 | C62E | 284 | JZ | DCWAIT | ;WAIT FOR THE FIRST KEY |
|      |      | 285 ; | | | |
| 0132 | 23F2 | 286 | MOV | A,#242 | ;IS THE KEY BACKSPACE? |
| 0134 | 6D   | 287 | ADD | A,R5 | |
| 0135 | 9650 | 288 | JNZ | DKEYIN | |
| 0137 | 742E | 289 | CALL | DSWAP | ;EXCHANGE CAPTIONS ON THE DISPLAY |
| 0139 | 95   | 290 | CPL | F0 | ;SET DIRECTION TO BACKWARD |
| 013A | 14D8 | 291 | DMAIN: CALL | GETKEY | ;WAIT FOR NEXT KEY |
| 013C | 9650 | 292 | JNZ | DKEYIN | |
| 013E | B814 | 293 | MOV | R0,#20 | ;GET SCROLL FLAG |
| 0140 | F0   | 294 | MOV | A,@R0 | |

ISIS-II 8048 ASSEMBLER, V1.2
DICTIONARY MAIN LOOP -continued

```
LOC   OBJ      SEQ            SOURCE STATEMENT

0141  C63A     295             JZ      DMAIN   ;NO FLAG => NO SCROLL
0143  34F2     296             CALL    DWORD
0145  14F5     297             CALL    INCR7
0147  FF       298             MOV     A,R7
0148  963A     299             JNZ     DMAIN   ;IS A PASS COMPLETE?
014A  230F     300             MOV     A,#15
014C  146D     301             CALL    ROTATE
014E  243A     302             JMP     DMAIN
               303 ;
0150  23D5     304 DKEYIN: MOV A,#213   ;IS KEY = MODE?
0152  6D       305             ADD     A,R5
0153  C663     306             JZ      MODE
0155  FB       307             MOV     A,R3      ;GET MODE FLAG
0156  B271     308             JB5     CALCUL
0158  B816     309             MOV     R0,#22    ;GET SUBMODE
015A  F0       310             MOV     A,@R0
015B  126B     311             JB0     ENTER1
015D  326D     312             JB1     DISPL1
015F  526F     313             JB2     SCROL1
0161  44CA     314             JMP     QUERY
               315 ;
0163  2376     316 MODE:   MOV A,#76H    ;PAGE 3 ADDRESS OF CAPTION
0165  14CC     317             CALL    DISCAP
0167  BB20     318             MOV     R3,#32    ;SET MODE TO CALCULATOR
0169  243A     319             JMP     DMAIN
               320 ;
               321 ;
016B  2475     322 ENTER1: JMP ENTER
016D  0488     323 DISPL1: JMP DISPLY
016F  04B0     324 SCROL1: JMP SCROLL
0171  54B0     325 CALCUL: CALL KCLEAR  ;WAIT FOR KEY BUFF TO EMPTY
0173  0400     326             JMP     START   ;ANY KEY SETS MODE TO DICTIONARY
               327 $TITLE ('ENTER SUBMODE')
```

ISIS-II 8048 ASSEMBLER, V1.2
ENTER SUBMODE

```
LOC   OBJ      SEQ            SOURCE STATEMENT

0175  A5       328 ENTER:  CLR     F1
0176  B815     329             MOV     R0,#21    ;PASS FLAG
0178  B001     330             MOV     @R0,#1    ;SET IT TO SPANISH (SECOND PART)
017A  B67D     331             JF0     ECON
017C  10       332             INC     @R0
017D  23F2     333 ECON:   MOV     A,#242    ;IS CHAR = BACKSPACE?
017F  6D       334             ADD     A,R5
0180  C6E4     335             JZ      EBS
0182  23F1     336             MOV     A,#241    ;IS CHAR = TRANSLATE?
0184  6D       337             ADD     A,R5
0185  C6CD     338             JZ      EXLAT
0187  23F0     339             MOV     A,#240    ;IS CHAR = QUERY?
0189  6D       340             ADD     A,R5
018A  C6E2     341             JZ      QUERY2
018C  23D4     342             MOV     A,#212    ;IS CHAR = STEP?
```

ISIS-II 8048 ASSEMBLER, V1.2
ENTER SUBMODE -continued

| LOC OBJ | SEQ | | SOURCE STATEMENT | | |
|---|---|---|---|---|---|
| 018E 6D | 343 | | ADD | A,R5 | |
| 018F C6B0 | 344 | | JZ | ESTEP | |
| 0191 23F3 | 345 | | MOV | A,#243 | ;IS CHAR = SPACE? |
| 0193 6D | 346 | | ADD | A,R5 | |
| 0194 C6AD | 347 | | JZ | ESPACE | |
| 0196 FE | 348 | | MOV | A,R6 | ;GET CHARACTER COUNT |
| 0197 96A4 | 349 | | JNZ | ENORM | |
| 0199 14EA | 350 | | CALL | CLIMAG | ;CLEAR IMAGE |
| 019B FF | 351 | | MOV | A,R7 | ;CURRENT POINTER |
| 019C 6F | 352 | | ADD | A,R7 | ;DOUBLE IT |
| 019D 0330 | 353 | | ADD | A,#48 | ;BASE OF POINTERS |
| 019F A8 | 354 | | MOV | R0,A | |
| 01A0 27 | 355 | | CLR | A | |
| 01A1 A0 | 356 | | MOV | @R0,A | |
| 01A2 18 | 357 | | INC | R0 | |
| 01A3 A0 | 358 | | MOV | @R0,A | ;CLEAR THIS POINTER |
| 01A4 FE | 359 | ENORM: | MOV | A,R6 | |
| 01A5 923A | 360 | | JB4 | DMAIN | ;IS CHAR COUNT = 16? |
| 01A7 1E | 361 | | INC | R6 | ;INCREMENT CHAR COUNT |
| 01A8 FD | 362 | | MOV | A,R5 | ;GET CHAR |
| 01A9 1460 | 363 | | CALL | ROTATE | ;INSERT IT IN IMAGE |
| 01AB 243A | 364 | | JMP | DMAIN | |
| | 365 ; | | | | |
| 01AD FE | 366 | ESPACE: | MOV | A,R6 | ;CHAR COUNT |
| 01AE C6D8 | 367 | | JZ | NOTFND | |
| | 368 ; | | | | |
| 01B0 FE | 369 | ESTEP: | MOV | A,R6 | |
| 01B1 96BC | 370 | | JNZ | ESEARH | ;IS CHAR COUNT ZERO? |
| 01B3 1F | 371 | | INC | R7 | |
| 01B4 FF | 372 | | MOV | A,R7 | ;INCREMENT INDEX |
| 01B5 5307 | 373 | | ANL | A,#7 | ;MODULO 8 |
| 01B7 AF | 374 | | MOV | R7,A | |
| 01B8 34F2 | 375 | | CALL | DWORD | |
| 01BA 243A | 376 | | JMP | DMAIN | |
| | 377 ; | | | | |
| 01BC 34EE | 378 | ESEARH: | CALL | SEARC2 | ;MINUS 6 |
| 01BE C6D8 | 379 | | JZ | NOTFND | |
| 01C0 3400 | 380 | | CALL | ADIX2P | ;COPY SEARCH RESULT TO WORD POINTER |
| 01C2 BE00 | 381 | | MOV | R6,#0 | ;CLEAR CHAR COUNT |
| 01C4 1F | 382 | | INC | R7 | ;WORD INDEX |
| 01C5 FF | 383 | | MOV | A,R7 | |
| 01C6 5307 | 384 | | ANL | A,#7 | ;MODULO 8 |
| 01C8 AF | 385 | | MOV | R7,A | |
| 01C9 34F2 | 386 | | CALL | DWORD | ;DISPLAY THE NEXT WORD |
| 01CB 243A | 387 | | JMP | DMAIN | |
| | 388 ; | | | | |
| 01CD FE | 389 | EXLAT: | MOV | A,R6 | |
| 01CE C6E0 | 390 | | JZ | DSTRT2 | ;IS CHAR COUNT ZERO? |
| 01D0 34EE | 391 | | CALL | SEARC2 | ;MINUS 6 |
| 01D2 C6D8 | 392 | | JZ | NOTFND | |
| 01D4 3400 | 393 | | CALL | ADIX2P | |
| 01D6 24E0 | 394 | | JMP | DSTRT2 | |
| | 395 ; | | | | |
| 01D8 BE00 | 396 | NOTFND: | MOV | R6,#0 | ;CLEAR CHAR COUNT |
| 01DA 236C | 397 | | MOV | A,#6CH | |

ISIS-II 8048 ASSEMBLER, V1.2
ENTER SUBMODE-continued

| LOC OBJ | SEQ | | SOURCE STATEMENT | | |
|---|---|---|---|---|---|
| 01DC 14CC | 398 | | CALL | DISCAP | ;DISPLAY 'NOT FOUND' |
| 01DE 243A | 399 | DMAIN2: | JMP | DMAIN | |
| 01E0 0478 | 400 | DSTRT2: | JMP | DSTART | |
| 01E2 4486 | 401 | QUERY2: | JMP | QUERYS | |
| | 402 | ; | | | |
| 01E4 FE | 403 | EBS: | MOV | A,R6 | |
| 01E5 C6DE | 404 | | JZ | DMAIN2 | ;IS CHAR COUNT ZERO? |
| 01E7 CE | 405 | | DEC | R6 | ;DECREMENT CHAR COUNT |
| 01E8 232F | 406 | | MOV | A,#47 | ;LEFT OF DISPLAY |
| 01EA 14C2 | 407 | | CALL | SHIFT | |
| 01EC 243A | 408 | | JMP | DMAIN | |
| | 409 | ; | | | |
| 01EE 14E2 | 410 | SEARC2: | CALL | SSETUP | ;SET UP THE ADDRESS IN 18 AND 19 |
| 01F0 4429 | 411 | | JMP | SEARCH | |
| | 412 | ; | | | |
| | 413 | $TITLE ('DWORD ROUTINE') | | | |

ISIS-II 8048 ASSEMBLER, V1.2
DWORD ROUTINE

| LOC OBJ | SEQ | | SOURCE STATEMENT | | |
|---|---|---|---|---|---|
| | 414 | ; | | | |
| | 415 | ;DWORD WILL DISPLAY THE NEXT WORD OF EITHER SOURCE OR TRANSLATION BY INSERTING | | | |
| | 416 | ;WITH ROTATE THE BYTE FOUND AT GETBYT UNTIL AN END IS REACHED. R7 - THE | | | |
| | 417 | ;WORD POINTER - IS NOT CHANGED. PASS FLAG DETERMINES WHETHER | | | |
| | 418 | ;THE FIRST OR SECOND ENTRY IS DISPLAYED. | | | |
| | 419 | ; | | | |
| 01F2 FF | 420 | DWORD: | MOV | A,R7 | ;GET WORD POINTER |
| 01F3 6F | 421 | | ADD | A,R7 | ;DOUBLE THE POINTER |
| 01F4 0330 | 422 | | ADD | A,#48 | ;BASE OF ADDRESS TABLE |
| 01F6 A8 | 423 | | MOV | R0,A | |
| 01F7 F0 | 424 | | MOV | A,@R0 | |
| 01F8 B91B | 425 | | MOV | R1,#27 | |
| 01FA A1 | 426 | | MOV | @R1,A | |
| 01FB 18 | 427 | | INC | R0 | |
| 01FC 19 | 428 | | INC | R1 | |
| 01FD 20 | 429 | | XCH | A,@R0 | ;GET NEXT BYTE AND KEEP LAST ONE |
| 01FE A1 | 430 | | MOV | @R1,A | |
| 01FF 20 | 431 | | XCH | A,@R0 | ;RESTORE THE BYTE |
| 0200 40 | 432 | | ORL | A,@R0 | ;TEST FOR THE NULL POINTER |
| 0201 C628 | 433 | | JZ | DWEX1 | ;FOR NOW JUST TO CHECK |
| 0203 B815 | 434 | | MOV | R0,#21 | ;POINT TO PASS FLAG |
| 0205 F0 | 435 | | MOV | A,@R0 | |
| 0206 17 | 436 | | INC | A | |
| 0207 1211 | 437 | | JB0 | DWLOOP | |
| 0209 B91B | 438 | DWCYC: | MOV | R1,#27 | |
| 020B 5496 | 439 | | CALL | RROM + 2 | ;READ NEXT BYTE FROM THE TABLE |
| 020D D211 | 440 | | JB6 | DWLOOP | ;JUMP IF END OF 1ST PART |
| 020F 4409 | 441 | | JMP | DWCYC | |
| 0211 7619 | 442 | DWLOOP: | JF1 | DWFAST | |
| 0213 B817 | 443 | | MOV | R0,#23 | ;4 HZ TIKKER |
| 0215 F0 | 444 | | MOV | A,@R0 | |
| 0216 9611 | 445 | | JNZ | DWLOOP | |

ISIS-II 8048 ASSEMBLER, V1.2
DWORD ROUTINE -continued

| LOC | OBJ | SEQ | | SOURCE STATEMENT | | |
|---|---|---|---|---|---|---|
| 0218 | 10 | 446 | | INC | @R0 | ;CHANGE 4HZ TIKKER |
| 0219 | B91B | 447 | DWFAST: | MOV | R1,#27 | |
| 021B | 5496 | 448 | | CALL | RROM + 2 | ;READ NEXT BYTE OF TABLE |
| 021D | 146D | 449 | | CALL | ROTATE | ;DISPLAY IT |
| 021F | FD | 450 | | MOV | A,R5 | ;IS THE CHAR AN END? |
| 0220 | 53C0 | 451 | | ANL | A,#0C0H | |
| 0222 | C611 | 452 | | JZ | DWLOOP | ; NO => GET NEXT BYTE |
| 0224 | 232D | 453 | DWEXIT: | MOV | A,#45 | ;PUT A SPACE BETWEEN WORDS |
| 0226 | 146D | 454 | | CALL | ROTATE | |
| 0228 | 83 | 455 | DWEX1: | RET | | |
| | | 456 | ; | | | |
| | | 457 | $ TITLE ('SEARCH SUBROUTINE') | | | |

ISIS-II 8048 ASSEMBLER, V1.2
SEARCH SUBROUTINE

| LOC | OBJ | SEQ | | SOURCE STATEMENT | | |
|---|---|---|---|---|---|---|
| | | 458 | ; | | | |
| | | 459 | ;SEARCH WILL EXAMINE THE DICTIONARY IN ROM (TRANSLATION TABLE) FOR | | | |
| | | 460 | ;ENTRIES WHICH MATCH THE CONTENTS OF IMAGE. THE STARTING LOCATION FOR | | | |
| | | 461 | ;THE SEARCH IS IN RAM LOCATIONS 18,19. THE ADDRESS OF THE NEXT ENTRY | | | |
| | | 462 | ;AFTER THE HIT IS LEFT IN RAM 16,17. THE ACCUMULATOR IS CLEARED ONLY | | | |
| | | 463 | ;IF NO HIT IS FOUND. GENERAL FLAG ZERO (F0) DETERMINES WHETHER THE SEARCH | | | |
| | | 464 | ;IS MADE AGAINST THE 1ST OR THE 2ND PART OF THE ENTRY. THE ADDRESS | | | |
| | | 465 | ;RETURNED IS ALWAYS FOR THE 1ST PART. A SPACE CODE (45) IN THE IMAGE | | | |
| | | 466 | ;IS ALWAYS PRESUMED TO MATCH MEMORY. LEADING SPACES ARE NOT SEARCHED FOR. | | | |
| | | 467 | ; | | | |
| 0229 | A5 | 468 | SEARCH: | CLR | F1 | |
| 022A | B810 | 469 | | MOV | R0,#16 | ;COPY START ADDRESS TO NEXT |
| 022C | B912 | 470 | | MOV | R1,#18 | |
| 022E | F1 | 471 | | MOV | A,@R1 | |
| 022F | A0 | 472 | | MOV | @R0,A | |
| 0230 | 18 | 473 | | INC | R0 | |
| 0231 | 19 | 474 | | INC | R1 | |
| 0232 | F1 | 475 | | MOV | A,@R1 | |
| 0233 | A0 | 476 | | MOV | @R0,A | |
| 0234 | BC10 | 477 | | MOV | R4,#16 | ;ARGUMENT LENGTH |
| 0236 | B830 | 478 | | MOV | R0,#48 | ;IMAGE POINTER |
| 0238 | C8 | 479 | SSCAN: | DEC | R0 | |
| 0239 | 23D3 | 480 | | MOV | A,#211 | ;A COMPLEMENT SPACE |
| 023B | 60 | 481 | | ADD | A,@R0 | |
| 023C | 9642 | 482 | | JNZ | SPART | |
| 023E | EC38 | 483 | | DJNZ | R4,SSCAN | |
| 0240 | 27 | 484 | SNOMAT: | CLR | A | |
| 0241 | 83 | 485 | | RET | | |
| | | 486 | ; | | | |
| 0242 | B646 | 487 | SPART: | JF0 | S2ND | |
| 0244 | 444F | 488 | | JMP | SLOOP | |
| 0246 | 5494 | 489 | S2ND: | CALL | RROM | |
| 0248 | FD | 490 | | MOV | A,R5 | |
| 0249 | D24D | 491 | | JB6 | S2XX | |
| 024B | 4446 | 492 | | JMP | S2ND | |
| 024D | F24D | 493 | S2XX: | JB7 | SNOMAT | |

ISIS-II 8048 ASSEMBLER, V1.2
SEARCH SUBROUTINE -continued

| LOC | OBJ | SEQ | | SOURCE STATEMENT | | |
|---|---|---|---|---|---|---|
| 024F | 5494 | 494 | SLOOP: | CALL | RROM | |
| 0251 | 2303 | 495 | | MOV | A,#03H | ;2'S COMPLEMENT OF A SPACE |
| 0253 | 60 | 496 | | ADD | A,@R0 | ;IS THE NEXT IMAGE BYTE A SPACE? |
| 0254 | C65E | 497 | | JZ | MATBYT | ;SPACES ARE PRESUMED TO MATCH |
| 0256 | FD | 498 | | MOV | A,R5 | ;GET LAST BYTE READ |
| 0257 | 533F | 499 | | ANL | A,#63 | ;MASK OFF JUNK |
| 0259 | 37 | 500 | | CPL | A | |
| 025A | 17 | 501 | | INC | A | |
| 025B | 60 | 502 | | ADD | A,@R0 | |
| 025C | 9671 | 503 | | JNZ | NOMATB | |
| 025E | C8 | 504 | MATBYT: | DEC | R0 | ;IMAGE POINTER |
| 025F | CC | 505 | | DEC | R4 | ;DECREMENT ARGUMENT LENGTH |
| 0260 | FC | 506 | | MOV | A,R4 | ;ARGUMENT LENGTH |
| 0261 | C66A | 507 | | JZ | STEST | |
| 0263 | FD | 508 | | MOV | A,R5 | |
| 0264 | F22A | 509 | | JB7 | SEARCH+1 | |
| 0266 | D276 | 510 | | JB6 | NOMX | |
| 0268 | 444F | 511 | | JMP | SLOOP | |
| | | 512 | ; | | | |
| 026A | 7680 | 513 | STEST: | JF1 | SGOOD | ;SHORT SEARCHES ARE OK IF F1 |
| 026C | FD | 514 | | MOV | A,R5 | |
| 026D | 03C0 | 515 | | ADD | A,#0C0H | |
| 026F | F680 | 516 | | JC | SGOOD | ;SEARCH IS GOOD IF BYTE WAS AN END |
| 0271 | FD | 517 | NOMATB: | MOV | A,R5 | |
| 0272 | D27A | 518 | | JB6 | STEOT | |
| 0274 | F22A | 519 | | JB7 | SEARCH+1 | |
| 0276 | 5494 | 520 | NOMX: | CALL | RROM | |
| 0278 | 4471 | 521 | | JMP | NOMATB | |
| 027A | F240 | 522 | STEOT: | JB7 | SNOMAT | |
| 027C | 4476 | 523 | | JMP | NOMX | |
| | | 524 | ; | | | |
| | | 525 | ; | | | |
| 027E | 5494 | 526 | SFARG: | CALL | RROM | |
| 0280 | FD | 527 | SGOOD: | MOV | A,R5 | |
| 0281 | F285 | 528 | | JB7 | SGEND | |
| 0283 | 447E | 529 | | JMP | SFARG | |
| 0285 | B910 | 530 | SGEND: | MOV | R1,#16 | |
| 0287 | B812 | 531 | | MOV | R0,#18 | |
| 0289 | F0 | 532 | | MOV | A,@R0 | |
| 028A | 21 | 533 | | XCH | A,@R1 | |
| 028B | A0 | 534 | | MOV | @R0,A | |
| 028C | 18 | 535 | | INC | R0 | |
| 028D | 19 | 536 | | INC | R1 | |
| 028E | F0 | 537 | | MOV | A,@R0 | |
| 028F | 21 | 538 | | XCH | A,@R1 | |
| 0290 | A0 | 539 | | MOV | @R0,A | |
| 0291 | 2306 | 540 | | MOV | A,#6 | |
| 0293 | 83 | 541 | | RET | | |
| | | 542 | ; | | | |
| | | 543 | ; | | | |
| | | 544 | $ TITLE ('ROM READER') | | | |

ISIS-II 8048 ASSEMBLER, V1.2
ROM READER

```
LOC  OBJ       SEQ        SOURCE STATEMENT

545 ;
               546 ;RROM WILL READ THE NEXT ROM LOCATION, WHICH IS CONTAINED IN
               547 ;RAM LOCATIONS 18,19, AND THEN INCREMENT THE CONTENTS OF 18 AND
               548 ;19. THE BYTE IS LEFT IN R5 AND IN A.
               549 ;
0294 B912      550 RROM:     MOV    R1,#18
0296 35        551           DIS    TCNTI
0297 F1        552           MOV    A,@R1
0298 39        553           OUTL   P1,A
0299 11        554           INC    @R1
029A 17        555           INC    A
029B 19        556           INC    R1
029C C6AC      557           JZ     RROMX
029E F1        558           MOV    A,@R1
029F 72A5      559 ROMXX:    JB3    RAD1      ;ADJUST ADDRESS FOR BREADBOARD
02A1 4310      560           ORL    A,#10H
02A3 44A7      561           JMP    ROMXXX
02A5 53EF      562 RAD1:     ANL    A,#0EFH
02A7 3A        563 ROMXXX:   OUTL   P2,A
02A8 80        564           MOVX   A,@R0     ;READ THE ROM
02A9 25        565           EN     TCNTI
02AA AD        566           MOV    R5,A
02AB 83        567           RET
02AC F1        568 RROMX:    MOV    A,@R1
02AD 11        569           INC    @R1
02AE 449F      570           JMP    ROMXX
               571 ;
               572 ;
               573 ;
               574 ;
               575 ;
               576 ;KCLEAR WILL WAIT UNTIL THE KEYBOARD STATE FLAG BECOMES INACTIVE
               577 ;
02B0 B81D      578 KCLEAR:   MOV    R0,#29
02B2 F0        579           MOV    A,@R0
02B3 96B0      580           JNZ    KCLEAR
02B5 83        581           RET
               582 $TITLE ('QUERY SUBMODE')
```

ISIS-II 8048 ASSEMBLER, V1.2
QUERY SUBMODE

```
LOC  OBJ       SEQ        SOURCE STATEMENT

02B6 A5        583 QUERYS:   CLR    F1
02B7 B5        584           CPL    F1        ;SET THE SHORT SEARCH AND FAST DISPLAY FLAG
02B8 14EA      585           CALL   CLIMAG    ;CLEAR IMAGE
02BA 27        586           CLR    A
02BB AE        587           MOV    R6,A      ;CLEAR CHAR COUNT
02BC BF71      588           MOV    R7,#71H   ;THE WILD WAY TO 18 AND 19
02BE B816      589           MOV    R0,#22
02C0 B008      590           MOV    @R0,#8    ;SET SUBMODE TO QUERY
02C2 C8        591           DEC    R0        ;POINT TO PASS FLAG
```

ISIS-II 8048 ASSEMBLER, V1.2
QUERY SUBMODE-continued

| LOC OBJ | SEQ | | SOURCE STATEMENT | | |
|---|---|---|---|---|---|
| 02C3 B001 | 592 | | MOV | @R0,#1 | ;SET IT TO BACKWARDS |
| 02C5 B6C8 | 593 | | JF0 | DMAIN3 | |
| 02C7 10 | 594 | | INC | @R0 | |
| 02C8 243A | 595 | DMAIN3: | JMP | DMAIN | |
| | 596 | ; | | | |
| 02CA 23F3 | 597 | QUERY: | MOV | A,#243 | ;IS CHAR = SPACE? |
| 02CC 6D | 598 | | ADD | A,R5 | |
| 02CD 96D3 | 599 | | JNZ | QNS | |
| 02CF BD2D | 600 | | MOV | R5,#45 | |
| 02D1 44EB | 601 | QNBS2: | JMP | QNBS | |
| 02D3 23D4 | 602 | QNS: | MOV | A,#212 | ;IS CHAR = STEP? |
| 02D5 6D | 603 | | ADD | A,R5 | |
| 02D6 C6F3 | 604 | | JZ | QDOIT | |
| 02D8 23F1 | 605 | | MOV | A,#241 | ;IS CHAR = TRANSLATE? |
| 02DA 6D | 606 | | ADD | A,R5 | |
| 02DB C6F3 | 607 | | JZ | QDOIT | |
| 02DD 23F0 | 608 | | MOV | A,#240 | ;IS CHAR = QUERY? |
| 02DF 6D | 609 | | ADD | A,R5 | |
| 02E0 96E4 | 610 | | JNZ | QCONX | |
| 02E2 44B6 | 611 | | JMP | QUERYS | |
| 02E4 23F2 | 612 | QCONX: | MOV | A,#242 | ;IS CHAR = BACKSPACE? |
| 02E6 6D | 613 | | ADD | A,R5 | |
| 02E7 96D1 | 614 | | JNZ | QNBS2 | |
| 02E9 24E4 | 615 | | JMP | EBS | |
| 02EB 1E | 616 | QNBS: | INC | R6 | |
| 02EC FD | 617 | | MOV | A,R5 | |
| 02ED 146D | 618 | | CALL | ROTATE | ;INSERT THE NEW CHAR |
| 02EF 243A | 619 | | JMP | DMAIN | |
| 02F1 640A | 620 | QAGIN1: | JMP | QAGAIN | |
| 02F3 B816 | 621 | QDOIT: | MOV | R0,#22 | |
| 02F5 F0 | 622 | | MOV | A,@R0 | |
| 02F6 92F1 | 623 | | JB4 | QAGIN1 | |
| 02F8 B018 | 624 | | MOV | @R0,#18H | ;SET STEP FLAG FOR NEXT TIME |
| 02FA B820 | 625 | | MOV | R0,#32 | ;BASE OF IMAGE |
| 02FC B930 | 626 | | MOV | R1,#48 | ;BASE OF HI RAM |
| 02FE BC10 | 627 | | MOV | R4,#16 | ;LOOP CONTROL |
| 0300 F0 | 628 | QSLOOP: | MOV | A,@R0 | ;COPY ENTERED WORD TO HI RAM |
| 0301 A1 | 629 | | MOV | @R1,A | |
| 0302 18 | 630 | | INC | R0 | |
| 0303 19 | 631 | | INC | R1 | |
| 0304 EC00 | 632 | | DJNZ | R4,QSLOOP | |
| 0306 B910 | 633 | | MOV | R1,#16 | |
| 0308 14E4 | 634 | | CALL | SSETUP + 2 | ;PUT PROPER ADDRESS IN 18,19 FOR SEARCH |
| | 635 | ; | | | |
| 030A B820 | 636 | QAGAIN: | MOV | R0,#32 | |
| 030C B930 | 637 | | MOV | R1,#48 | |
| 030E BC10 | 638 | | MOV | R4,#16 | |
| 0310 F1 | 639 | QCOPY: | MOV | A,@R1 | |
| 0311 A0 | 640 | | MOV | @R0,A | |
| 0312 18 | 641 | | INC | R0 | |
| 0313 19 | 642 | | INC | R1 | |
| 0314 EC10 | 643 | | DJNZ | R4,QCOPY | |

ISIS-II 8048 ASSEMBLER, V1.2
QUERY SUBMODE-continued

```
LOC  OBJ       SEQ           SOURCE STATEMENT

0316 B810      644 QSEARH:  MOV    R0,#16      ;SET UP START ADDRESS FOR SEARCH
0318 B912      645          MOV    R1,#18
031A F0        646          MOV    A,@R0
031B A1        647          MOV    @R1,A
031C 18        648          INC    R0
031D 19        649          INC    R1
031E F0        650          MOV    A,@R0
031F A1        651          MOV    @R1,A
0320 542A      652          CALL   SEARCH + 1  ;SEARCH FOR MATCH
0322 9626      653          JNZ    QDISPY
0324 0400      654          JMP    START       ;END OF QUERY GOES BACK TO DICTON
0326 232D      655 QDISPY:  MOV    A,#45
0328 146D      656          CALL   ROTATE
032A 34F2      657 QLOOP:   CALL   DWORD
032C 243A      658          JMP    DMAIN
               659 ;
               660 ;
               661 ;DSWAP WILL EXCHANGE THE FIRST 7 BYTES OF THE DISPLAY WITH THE LAST
               662 ;
032E B82F      663 DSWAP:   MOV    R0,#47
0330 B926      664          MOV    R1,#38
0332 BC07      665          MOV    R4,#7       ;LOOP CONTROL
0334 F0        666 SWLOOP:  MOV    A,@R0
0335 21        667          XCH    A,@R1
0336 A0        668          MOV    @R0,A
0337 C8        669          DEC    R0
0338 C9        670          DEC    R1
0339 EC34      671          DJNZ   R4,SWLOOP
033B 83        672          RET
               673 ;
               674 $ TITLE ('MESSAGES')
```

ISIS-II 8048 ASSEMBLER, V1.2
MESSAGES

```
LOC  OBJ       SEQ           SOURCE STATEMENT 036C           675          ORG    36CH
               676 ;
               677 ;
036C 20        678          DB     45,30,31,36,45   ;-NOT-
036D 1E
036E 1F
036F 24
0370 20
0371 16        679          DB     22,31,37,30,28   ;FOUND
0372 1F
0373 25
0374 1E
0375 14
0376 13        680          DB     19,17,28,19,37   ;CALCU
0377 11
0378 1C
0379 13
```

ISIS-II 8048 ASSEMBLER, V1.2
MESSAGES -continued

| LOC | OBJ | SEQ | SOURCE STATEMENT | | | |
|---|---|---|---|---|---|---|
| 037A | 25 | | | | | |
| 037B | 1C | 681 | DB | 28,17,36,31,34 | ;LATOR | |
| 037C | 11 | | | | | |
| 037D | 24 | | | | | |
| 037E | 1F | | | | | |
| 037F | 22 | | | | | |
| | | 682 ; | | | | |
| | | 683 $ TITLE ('DISPLAY TABLE') | | | | |

ISIS-II 8048 ASSEMBLER, V1.2
DISPLAY TABLE

| LOC | OBJ | SEQ | SOURCE STATEMENT | PORT 1 | PORT 2 | CHAR NUMBER | GRAPHIC |
|---|---|---|---|---|---|---|---|
| | | 684 ; | | | | | |
| | | 685 ; | | | | | |
| | | 686 ; | | | | | |
| | | 687 ; | | | | | |
| | | 688 ; | DISPLAY TABLE | | | | |
| | | 689 ; | | | | | |
| | | 690 ; | | | | | |
| | | 691 ; | | | | | |
| 0380 | DA | 692 DSTBL: | DB | 0DAH,0BAH | | ;0 | 0 |
| 0381 | BA | | | | | | |
| 0382 | 04 | 693 | DB | 4,4 | | ;1 | 1 |
| 0383 | 04 | | | | | | |
| 0384 | 48 | 694 | DB | 048H,18H | | ;2 | 2 |
| 0385 | 18 | | | | | | |
| 0386 | C2 | 695 | DB | 0C2H,33H | | ;3 | 3 |
| 0387 | 33 | | | | | | |
| 0388 | 05 | 696 | DB | 5,85H | | ;4 | 4 |
| 0389 | 85 | | | | | | |
| 038A | 43 | 697 | DB | 43H,0B3H | | ;5 | 5 |
| 038B | B3 | | | | | | |
| 038C | 4B | 698 | DB | 4BH,0A1H | | ;6 | 6 |
| 038D | A1 | | | | | | |
| 038E | 90 | 699 | DB | 90H,12H | | ;7 | 7 |
| 038F | 12 | | | | | | |
| 0390 | 4B | 700 | DB | 4BH,0BBH | | ;8 | 8 |
| 0391 | BB | | | | | | |
| 0392 | 41 | 701 | DB | 41H,0BBH | | ;9 | 9 |
| 0393 | BB | | | | | | |
| 0394 | 01 | 702 | DB | 1,1 | | ;10 | - |
| 0395 | 01 | | | | | | |
| 0396 | 80 | 703 | DB | 80H,0 | | ;11 | @ |
| 0397 | 00 | | | | | | |
| 0398 | 16 | 704 | DB | 16H,0 | | ;12 | DEC PT |
| 0399 | 00 | | | | | | |
| 039A | A0 | 705 | DB | 0A0H,1 | | ;13 | -> |
| 039B | 01 | | | | | | |
| 039C | 11 | 706 | DB | 11H,40H | | ;14 | <- |
| 039D | 40 | | | | | | |
| 039E | 01 | 707 | DB | 1,13H | | ;15 | == |
| 039F | 13 | | | | | | |

ISIS-II 8048 ASSEMBLER, V1.2
DISPLAY TABLE -continued

| LOC OBJ | SEQ | SOURCE STATEMENT | | | |
|---|---|---|---|---|---|
| 03A0 04<br>03A1 9B | 708 | DB | 4,9BH | ;16 | ? QUERY |
| 03A2 09<br>03A3 B8 | 709 | DB | 9,0B8H | ;17 | A |
| 03A4 46<br>03A5 3F | 710 | DB | 46H,3FH | ;18 | B |
| 03A6 4A<br>03A7 92 | 711 | DB | 4AH,92H | ;19 | C |
| 03A8 46<br>03A9 3E | 712 | DB | 46H,3EH | ;20 | D |
| 03AA 4B<br>03AB 92 | 713 | DB | 4BH,92H | ;21 | E |
| 03AC 09<br>03AD 92 | 714 | DB | 9,92H | ;22 | F |
| 03AE 4A<br>03AF B3 | 715 | DB | 4AH,0B3H | ;23 | G |
| 03B0 09<br>03B1 A9 | 716 | DB | 9,0A9H | ;24 | H |
| 03B2 46<br>03B3 16 | 717 | DB | 46H,16H | ;25 | I |
| 03B4 0E<br>03B5 16 | 718 | DB | 0EH,16H | ;26 | J |
| 03B6 A9<br>03B7 80 | 719 | DB | 0A9H,80H | ;27 | K |
| 03B8 4A<br>03B9 80 | 720 | DB | 4AH,80H | ;28 | L |
| 03BA 88<br>03BB E8 | 721 | DB | 88H,0E8H | ;29 | M |
| 03BC 28<br>03BD E8 | 722 | DB | 28H,0E8H | ;30 | N |
| 03BE 4A<br>03BF BA | 723 | DB | 4AH,0BAH | ;31 | O |
| 03C0 09<br>03C1 9B | 724 | DB | 9,9BH | ;32 | P |
| 03C2 6A<br>03C3 BA | 725 | DB | 6AH,0BAH | ;33 | Q |
| 03C4 29<br>03C5 9B | 726 | DB | 29H,9BH | ;34 | R |
| 03C6 43<br>03C7 B3 | 727 | DB | 43H,0B3H | ;35 | S |
| 03C8 04<br>03C9 16 | 728 | DB | 4,16H | ;36 | T |
| 03CA 4A<br>03CB A8 | 729 | DB | 4AH,0A8H | ;37 | U |
| 03CC 98<br>03CD 80 | 730 | DB | 98H,80H | ;38 | V |
| 03CE 38<br>03CF A8 | 731 | DB | 38H,0A8H | ;39 | W |
| 03D0 B0<br>03D1 40 | 732 | DB | 0B0H,40H | ;40 | X |
| 03D2 84<br>03D3 40 | 733 | DB | 84H,40H | ;41 | Y |
| 03D4 02<br>03D5 12 | 734 | DB | 0D2H,12H | ;41 | Z |
| 03D6 FF | 735 | DB | 0FFH,0FFH | ;43 | [X] MODE |

ISIS-II 8048 ASSEMBLER, V1.2
DISPLAY TABLE -continued

| LOC | OBJ | SEQ | SOURCE STATEMENT | | | |
|---|---|---|---|---|---|---|
| 03D7 | FF | | | | | |
| 03D8 | 09 | 736 | DB | 9,9 | ;44 | STEP |
| 03D9 | 09 | | | | | |
| 03DA | 00 | 737 | DB | 0,0 | ;45 | SPACE |
| 03DB | 00 | | | | | |
| 03DC | 05 | 738 | DB | 5,5 | ;46 | + |
| 03DD | 05 | | | | | |
| 03DE | 09 | 739 | DB | 9,1 | ;47 | / |
| 03DF | 01 | | | | | |
| | | 740 | ; | | | |
| | | 741 | $ TITLE ('DICTIONARY KEYBOARD TABLE') | | | |

ISIS-II 8048 ASSEMBLER, V1.2
DICTIONARY KEYBOARD TABLE

| LOC | OBJ | SEQ | SOURCE STATEMENT | CHAR NUMBER | ROW | COL | GRAPHIC |
|---|---|---|---|---|---|---|---|
| | | 742 | ; KEYBOARD TRANSLATE TABLE | | | | |
| | | 743 | ; | | | | |
| | | 744 | ; | | | | |
| | | 745 | ;LOOKUP VALUE IS (ROW*2)+COLUMN + (MODE) | | | | |
| | | 746 | ; | | | | |
| | | 747 | ; | | | | |
| | | 748 | ; | | | | |
| | | 749 | ; | | | | |
| 03E0 | 20 | 750 | KBTBL: DB | 32 | ;0 | 0 | P |
| 03E1 | 10 | 751 | DB | 16 | ;0 | 1 | QUERY |
| 03E2 | 1F | 752 | DB | 31 | ;1 | 0 | O |
| 03E3 | 1C | 753 | DB | 28 | ;1 | 1 | L |
| 03E4 | 19 | 754 | DB | 25 | ;2 | 0 | I |
| 03E5 | 1B | 755 | DB | 27 | ;2 | 1 | K |
| 03E6 | 25 | 756 | DB | 37 | ;3 | 0 | U |
| 03E7 | 1A | 757 | DB | 26 | ;3 | 1 | J |
| 03E8 | 29 | 758 | DB | 41 | ;4 | 0 | Y |
| 03E9 | 18 | 759 | DB | 24 | ;4 | 1 | H |
| 03EA | 24 | 760 | DB | 36 | ;5 | 0 | T |
| 03EB | 17 | 761 | DB | 23 | ;5 | 1 | G |
| 03EC | 22 | 762 | DB | 34 | ;6 | 0 | R |
| 03ED | 16 | 763 | DB | 22 | ;6 | 1 | F |
| 03EE | 15 | 764 | DB | 21 | ;7 | 0 | E |
| 03EF | 14 | 765 | DB | 20 | ;7 | 1 | D |
| 03F0 | 27 | 766 | DB | 39 | ;8 | 0 | W |
| 03F1 | 23 | 767 | DB | 35 | ;8 | 1 | S |
| 03F2 | 21 | 768 | DB | 33 | ;9 | 0 | Q |
| 03F3 | 11 | 769 | DB | 17 | ;9 | 1 | A |
| 03F4 | 2A | 770 | DB | 42 | ;10 | 0 | Z |
| 03F5 | 1D | 771 | DB | 29 | ;10 | 1 | M |
| 03F6 | 28 | 772 | DB | 40 | ;11 | 0 | X |
| 03F7 | 2B | 773 | DB | 43 | ;11 | 1 | MODE |
| 03F8 | 13 | 774 | DB | 19 | ;12 | 0 | C |
| 03F9 | 0D | 775 | DB | 13 | ;12 | 1 | -> |
| 03FA | 26 | 776 | DB | 38 | ;13 | 0 | V |
| 03FB | 0E | 777 | DB | 14 | ;13 | 1 | <- |
| 03FC | 12 | 778 | DB | 18 | ;14 | 0 | B |
| 03FD | 0F | 779 | DB | 15 | ;14 | 1 | = |
| 03FE | 1E | 780 | DB | 30 | ;15 | 0 | N |
| 03FF | 2C | 781 | DB | 44 | ;15 | 1 | STEP |
| | | 782 | END | | | | |

USER SYMBOLS

| | | | | | | | | | | | | | |
|---|---|---|---|---|---|---|---|---|---|---|---|---|---|
| ACTIV | 0033 | ADIX2P | 0100 | CALCUL | 0171 | CAPLUP | 011D | CLIMAG | 00EA | CLIMLP | 00F0 | CLOOP | 0065 |
| DCLEAR | 0128 | DCLOOP | 00D3 | DCWAIT | 012E | DICTON | 010E | DISCAP | 00CC | DISPL1 | 016D | DISPLY | 0088 |
| DKEYIN | 0150 | DMAIN | 013A | DMAIN2 | 01DE | DMAIN3 | 02C8 | DSLEW | 00A0 | DSTART | 0078 | DSTBL | 0380 |
| DSTEP | 00AA | DSTRT2 | 01E0 | DSWAP | 032E | DWCYC | 0209 | DWEX1 | 0228 | DWEXIT | 0224 | DWFAST | 0219 |
| DWLOOP | 0211 | DWORD | 01F2 | EBS | 01E4 | ECON | 017D | ENORM | 01A4 | ENTER | 0175 | ENTER1 | 016B |
| ESEARH | 01BC | ESPACE | 01AD | ESTEP | 0180 | EXLAT | 01CD | GETKEY | 00D8 | INCR7 | 00F5 | INCR7X | 00FA |
| INTER | 0007 | KBTBL | 03E0 | KCLEAR | 0280 | KEY1 | 004A | KEY2 | 004D | KEYIN | 004F | MATBYT | 025E |
| MODE | 0163 | NOMATB | 0271 | NOMX | 0276 | NOTFND | 01D8 | QAGAIN | 030A | QAGIN1 | 02F1 | QCONX | 02E4 |
| QCOPY | 0310 | QDISPY | 0326 | QDOIT | 02F3 | QLOOP | 032A | QNBS | 02EB | QNBS2 | 02D1 | QNS | 02D3 |
| QSEARH | 0316 | QSLOOP | 0300 | QUERY | 02CA | QUERY2 | 01E2 | QUERYS | 02B6 | RAD1 | 02A5 | RESTR | 002F |
| RET1 | 00F4 | RETURN | 00DA | REVEN | 0046 | RINAC | 0042 | ROLOOP | 0073 | ROMXX | 029F | ROMXXX | 02A7 |
| ROTATE | 006D | RROM | 0294 | RROMX | 02AC | S2ND | 0246 | S2XX | 0240 | SCROL1 | 016F | SCROLL | 00B0 |
| SEARC2 | 01EE | SEARCH | 0229 | SFARG | 027E | SGEND | 0285 | SGOOD | 0280 | SHIFT | 00C2 | SHLOOP | 00C7 |
| SLOOP | 024F | SNOMAT | 0248 | SPART | 0242 | SSCAN | 0238 | SSETUP | 00E2 | SSTART | 0060 | START | 0000 |
| STEOT | 027A | STEST | 026A | SWLOOP | 0334 | | | | | | | | |

ASSEMBLY COMPLETE, NO ERROR(S)

Other capabilities such as a digital clock and a calendar or providing a game, can, of course, be incorporated without departing from the scope of the invention. Many other changes and modifications in the above-decribed embodiment of the invention can, of course, be carried out without departing from the scope thereof. Accordingly, that scope is intended to be limited only by the scope of the appended claims.

What is claimed is:

1. An information storage and retrieval apparatus comprising:
    a hand-held housing including a main frame and a plug-in module removably connected to said main frame;
    a plurality of display means disposed on said main frame for each displaying an alpha-numeric character;
    means within said housing for driving each of said display means;
    a keyboard on said main frame and having a plurality of keys divided into groups of keys, each key being associated with an alpha-numeric character or command for entering, in response to manual operation thereof, a sequence of alpha-numeric characters and commands, and producing command signals and sequences of character signals, each character signal identifying a character;
    a read/write memory within said housing and connected to each of said display driving means for storing at least each character being currently displayed;
    a central processor within said housing connected to said read/write memory, to said display driving means and to said keys for producing control signals to cause searching of said keyboard to locate manually operated keys and cause storage and display of entered and stored characters;
    at least a first read/only memory (ROM) within said plug-in module and connected to said central processor for storing a plurality of pairs of sequences of alpha-numeric characters,
    said processor including means for searching said first ROM to compare, one pair after another, one sequence of each pair with a sequence entered into said keyboard following entry of a first given command produced by manual operation of a key on said keyboard until a match is made, and for causing, subsequent to a match, the matching pairs of sequences to be displayed with said one sequence preceding the other sequence in said matching pairs, the character in each said display means varying in time without any manual operation of said keyboard so that the number of characters in said matching pairs can exceed the number of said display means, said searching and causing means searching, upon a second given command, to compare said other sequence of each pair with said entered sequence following entry of said first command until a match is made and causing said matching pairs of sequences to be displayed with said other sequences preceding said one sequence;
    a second read/only memory (ROM) within said housing and connected to said read/write memory and said processor for storing instructions for searching said first ROM and causing said pair of sequences to be displayed, instructions for storing in said read/write memory, and instructions for searching of said keyboard; and
    logic means connecting said keyboard and said driving means to said processor for receiving control signals from said processor each identifying a character to be displayed in a given display means and a group of keys to be searched and for sequentially applying a signal to said driving means in response to one of said control signals so that each of said display means sequentially displays a character and applying a signal to one of said groups in response to one of said control signals so that each of said groups is sequentially searched by said processor to produce said command signals and sequences of character signals.

2. An apparatus as in claim 1 wherein said read/write memory is a random access memory (RAM) having a plurality of first storage locations each storing a character being currently displayed, each storage location being associated with one of said display means, and a plurality of second storage locations each storing the location in said first ROM of one of said pairs of sequences, said second ROM including display instructions for changing the characters stored in said first locations to sequentially substitute characters from the ROM locations stored in said second locations following entry of said first given command.

3. An apparatus as in claim 2 wherein said display instructions include instructions for periodically shifting the character of each said first storage location to another location, except for the one character that has been stored for the longest time, which one character is removed from storage, and placing a character from said first ROM in the location which did not receive a shifted character so as to roll the pair of sequences through said display means.

4. An apparatus as in claim 3 wherein said entered characters are stored in said first locations during searching of said first ROM so that entered characters are displayed during searching and wherein entry of a given character following a clear command shifts each of the other characters entered since said clear command to another of said first locations.

5. An apparatus as in claim 3 wherein said display instructions include instructions for placing characters from each of said one sequences at the locations of said first ROM stored at said second locations in said first locations of said RAM and then placing characters from each of said other sequences at the locations in said fiest ROM stored at said second locations in said first locations of said RAM so that each of the words entered into said keyboard are displayed one after another followed by the corresponding sequences in said first ROM.

6. An apparatus as in claim 1 wherein said second ROM includes instructions for performing arithmetical calculations, instead of said searching, upon first entry of a third command and for resuming searching upon second entry of said third command.

7. An apparatus as in claim 1 wherein each said display means includes a sixteen segment LED display.

8. An apparatus as in claim 1 wherein said second ROM, read/write memory and processor are formed on a semi-conductor chip.

9. An apparatus as in claim 1 wherein each character in said pair of sequences includes a first part identifying the location of the character in the sequence and pair of sequences and a second pair identifying the character.

10. An apparatus as in claim 1 wherein said second ROM includes instructions for matching, following a guery command, each blank character entered with any character in said sequence, and for displaying only the matched sequence.

11. An apparatus as in claim 10 wherein said blank character is entered by said first command.

12. An apparatus as in claim 1 wherein said first ROM stores an initial message and said instructions in said second ROM cause the display of said message each time a clear command is entered and each time the apparatus becomes operative.

13. An apparatus as in claim 1, wherein said logic means includes shift register means connected to said processor and responsive to control signals to shift its output state sequentially and apply said signal to each of said groups in turn, memory means simultaneously responsive to said control signals so that one of said display means displays a character.

14. An apparatus as in claim 1, further including a single bus means interconnecting said first ROM, said processor, and said logic means for carrying all signals therebetween including said character signals, and said command signals.

15. An apparatus as in claim 14, including a second bus means interconnecting said ROM and processor for supplying address signals to said first ROM while said first bus means carries said character signals from said ROM to said processor.

* * * * *

UNITED STATES PATENT AND TRADEMARK OFFICE
CERTIFICATE OF CORRECTION

PATENT NO. : 4,158,236
DATED : June 12, 1979
INVENTOR(S) : Michael Levy

It is certified that error appears in the above-identified patent and that said Letters Patent are hereby corrected as shown below:

Column 2, line 67, change "unit" to --until-- .

Column 6, line 11, after ", one sequence being" delete "," .

Column 8, line 35, change "occurance" to --occurrence-- .

Column 9, line 35, after "based on the last" insert --entered-- .

Column 11, line 46, change "elasped" to --elapsed-- .

Column 13, line 50, after "typing" insert --the-- .

Column 15, line 61, after "depressed while" insert --in-- .

Column 55, line 6, change "decribed" to --described-- .

UNITED STATES PATENT AND TRADEMARK OFFICE
CERTIFICATE OF CORRECTION

PATENT NO. : 4,158,236
DATED : June 12, 1979
INVENTOR(S) : Michael Levy

It is certified that error appears in the above-identified patent and that said Letters Patent are hereby corrected as shown below:

Claim 5, line 6, (Col. 56, line 54) change "fiest" to --first-- .

Claim 10, line 3, (Col. 57, line 12) change "guery" to --query-- .

Signed and Sealed this

Twentieth Day of November 1979

[SEAL]

Attest:

RUTH C. MASON
Attesting Officer

LUTRELLE F. PARKER
Acting Commissioner of Patents and Trademarks